US008346162B1

(12) United States Patent
Jayasimha et al.

(10) Patent No.: US 8,346,162 B1
(45) Date of Patent: Jan. 1, 2013

(54) SYSTEM AND METHOD FOR REDUCING VSAT APERTURES VIA SATELLITE MIMO

(75) Inventors: Sriram Jayasimha, Hyderabad (IN); Jyothendar Paladugula, Hyderabad (IN)

(73) Assignee: EMC SatCom Technologies, Miami, FL (US)

( * ) Notice: Subject to any disclaimer, the term of this patent is extended or adjusted under 35 U.S.C. 154(b) by 734 days.

(21) Appl. No.: 12/567,246

(22) Filed: Sep. 25, 2009

(51) Int. Cl.
*H04B 7/185* (2006.01)
*H04B 7/19* (2006.01)
*H04W 4/00* (2009.01)

(52) U.S. Cl. ...... 455/13.1; 455/12.1; 455/429; 455/13.2

(58) Field of Classification Search ............ 455/12.1, 455/13.1, 13.2, 427, 428, 429
See application file for complete search history.

(56) References Cited

U.S. PATENT DOCUMENTS

| | | | |
|---|---|---|---|
| 3,340,535 A | 9/1967 | Damonte et al. | |
| 4,233,576 A | 11/1980 | Pelchat | |
| 5,910,945 A * | 6/1999 | Garrison et al. | 370/324 |
| 5,995,832 A | 11/1999 | Mallinckrodt | |
| 6,339,707 B1 | 1/2002 | Wainfan et al. | |
| 6,356,539 B1 | 3/2002 | Zuliani et al. | |
| 6,381,225 B1 * | 4/2002 | Chockalingam et al. | 370/316 |
| 6,636,734 B1 | 10/2003 | Berger et al. | |
| 6,775,251 B1 | 8/2004 | Wiedeman et al. | |
| 6,823,170 B1 * | 11/2004 | Dent | 455/13.3 |
| 6,866,231 B2 | 3/2005 | Higgins | |
| 6,975,837 B1 | 12/2005 | Santoru | |
| 7,003,058 B2 | 2/2006 | Bach et al. | |

(Continued)

FOREIGN PATENT DOCUMENTS

WO WO-2008054917 A2 5/2008

OTHER PUBLICATIONS

Vasilios M. Kapinas, Maja Ilic, George K. Karagiamnidis, and Milica Pejanovic-Durisic, *"Aspects on Space and Polarization Diversity in Wireless Communication Systems"*, 15th Telecommunications forum TELFOR 2007, Serbia, Belgrade, Nov. 20-22, 2007, pp. 183-186.

(Continued)

*Primary Examiner* — Tilahun B Gesesse
(74) *Attorney, Agent, or Firm* — Blank Rome LLP

(57) ABSTRACT

A system and method of reducing VSAT apertures via satellite MIMO is disclosed. The system and method comprise a first hub antenna configured to receive a first return signal from and to transmit a first forward signal to a first adjacent satellite, a second hub antenna configured to receive a second return signal from and to transmit a second forward signal to a second adjacent satellite, and a hub station configured to determine time delay and frequency shift between the first return signal and the second return signal after they are received by the first hub antenna and the second hub antenna, and to apply the determined time delay and frequency shift to one of the first forward signal and the second forward signal prior to transmitting them so the first forward signal and the second forward signal are time- and frequency-aligned when received at the remote ground terminal via the first adjacent satellite and the second adjacent satellite, wherein the first return signal and the second return signal are transmitted from the remote ground terminal to the first hub antenna and the second hub antenna via the first adjacent satellite and the second adjacent satellite. Similar time- and frequency-aligning can be achieved at the remote ground terminal using polarized signals transmitted from the remote ground terminal.

34 Claims, 12 Drawing Sheets

U.S. PATENT DOCUMENTS

| | | |
|---|---|---|
| 7,154,964 B1 | 12/2006 | Al-Dhahir et al. |
| 7,248,841 B2 | 7/2007 | Agee et al. |
| 7,340,213 B2 | 3/2008 | Karabinis et al. |
| 7,430,257 B1 | 9/2008 | Shattil |
| 7,483,483 B2 | 1/2009 | Lakkis |
| 7,522,877 B1 | 4/2009 | Avellan et al. |
| 7,907,894 B2 * | 3/2011 | Avellan et al. ............... 455/13.3 |
| 2007/0021059 A1 | 1/2007 | Karabinis et al. |
| 2007/0184849 A1 | 8/2007 | Zheng |
| 2007/0279284 A1 | 12/2007 | Karayil Thekkoott Narayanan |
| 2008/0144734 A1 | 6/2008 | Dankberg et al. |
| 2008/0220806 A1 * | 9/2008 | Shin et al. .................... 455/522 |
| 2008/0311844 A1 | 12/2008 | Eidenschink |
| 2009/0034448 A1 | 2/2009 | Miller et al. |

OTHER PUBLICATIONS

Christopher C. DeBoy, The Johns Hopkins University—Applied Physics Laboratory, USA, Christopher Haskins, Dennis Duven, Ronald Schulze, Jr. Robert Jensen, Mark Bernacik and Wes Millard, The Johns Hopkins University—Applied Physics Laboratory, USA "*IAC-04-M.5.05 The New Horizons Mission to Pluto: Advances in Telecommunications System Design*", 55th International Astronautical Congress 2004—Vancouver, Canada, pp. 1-12.

S. Jayasimha and J. Paladugula, "*Canceling Echoes distorted by Satellite Transponders*", Proc. of Natl. Conf. on Comm. (NCC-2006) pp. 112-116, Omega Scientific Publishers, New Delhi, ISBN 81-85399-80-8.

\* cited by examiner

|  | antenna0 | antenna1 |
|---|---|---|
| time $t$ | $s_0$ | $s_1$ |
| time $t+T$ | $-s_1^*$ | $s_0^*$ |

| IC | Inputs/Outputs | Power Contributions | | |
|---|---|---|---|---|
| | | Carrier | Noise | Interference |
| $IC_1$ | $I_1, I_2$ | $\frac{1}{2}P, \frac{1}{2}P$ | $\gamma P, \gamma P$ | $\frac{1}{2}\beta^2 P, \frac{1}{2}\beta^2 P$ |
| | Combined A | $2P$ | $N_A = 2\gamma P$ | $I_A = \beta^2 P$ |
| TRIPLE $IC_A$ | $I_1', I_2'$ | $2P, \frac{1}{2}\beta^2 P$ | $N_A, N_A$ | $\beta^2 P, \frac{1}{2}\beta^2 P$ |
| | Combined B | $2P(1 + \frac{1}{2}\eta_1\beta)^2$ | $N_B = N_A + N_{D}$, $N_D = \eta_1^2 N_A(1+\frac{1}{4}\beta^2)$ | $\frac{1}{2}I_A + 0.125(\eta_1\beta^2 + 2\beta)^2 P + 0.125(\eta_1\beta^4 P)$ |
| | Combined B' | $2P(1 + \frac{1}{2}\eta_1\beta)^2$ | $N_{B'} = N_B + N_{D'};$ $N_{D'} = \eta_2^2 N_A(1 + \frac{1}{4}\beta^2)$ | $\frac{1}{2}I_A + \frac{1}{2}(\beta + \frac{1}{2}\eta_1\beta^2 - \eta_2\beta)^2 P + 0.125\beta^4(\eta_1^2 + 2\eta_2^3)P$ |
| TRIPLE $IC_B$ | $I_1', I_2'$ | $2P, \frac{1}{2}\beta^2 P$ | $N_A, N_A$ | $\beta^2 P, \frac{1}{2}\beta^2 P$ |
| | Combined C | $2P(1 + \eta_1\beta)^2$ | $N_C = N_{B'} + N_D$ | $\frac{1}{2}(\beta + \frac{1}{2}\eta_1\beta^2 - \eta_2\beta)^2 P + 0.125(\eta_1\beta^2 + 2\beta)^2 P + \frac{1}{4}\beta^4(\eta_1^2 + 2\eta_2^2)P$ |
| | Combined C' | $2P(1 + \eta_1\beta)^2$ | $N_{C'} = N_C + N_{D'}$ | $(\beta + \frac{1}{2}\eta_1\beta^2 - \eta_2\beta)^2 P + \frac{1}{4}\beta^4(\eta_1^2 + 2\eta_2^2)P$ |

FIG. 11

| IC | SINR at Input | $\gamma = 0$ and $\beta = 0.5$ | $\gamma = 0.125$ and $\beta = 0.5$ |
|---|---|---|---|
| $IC_1$ | $1/(4\gamma + 2\beta^2)$ | 3 dB | 0 dB |
| $IC_2$ and $IC_5$ | $2/[2\gamma(1 + 4\beta^2) + \beta^2 + 2]$ | -0.5 dB | -5.1 dB |
| $IC_3$ and $IC_6$ | $2/[4\gamma(1+2\beta^2) + 2\beta^2]$ | 6 dB | -4 dB |
| $IC_4$ and $IC_7$ | $\beta^2/[\gamma(8 + \beta^2) + 4 + \beta^2 + \frac{1}{2}\beta^4]$ | -12.3 dB | -13.3 dB |

FIG. 12

SYSTEM AND METHOD FOR REDUCING VSAT APERTURES VIA SATELLITE MIMO

FIELD OF THE INVENTION

The present invention relates to a system and method for reducing antenna apertures. More particularly, the present invention relates to a system and method for reducing antenna apertures for remote ground terminals using multiple-input-multiple-output (MIMO) processing.

BACKGROUND OF THE INVENTION

As FIG. 1 illustrates, conventional duplex communication systems 100 typically utilize a single satellite 102 for communication between a remote ground terminal 104 and a hub station 106. The satellite 102, a remote terminal antenna 108 at the remote ground terminal 104, and a hub antenna 110 at the hub station 106 form an independent forward point-to-point link (i.e., from the hub antenna 110 to the remote terminal antenna 108 via the satellite 102) and an independent return point-to-point link (i.e., from the remote terminal antenna 108 to the hub antenna 110 via the satellite 102). The hub station 106 typically uses a wideband carrier with Time Division Multiple Access (TDMA) coding to communicate with a plurality of remote ground terminals 104 via point-to-point forward links. And, the remote ground terminals 104 typically use Single Channel Per Carrier (SCPC)/Frequency-Division Multiplexing (FDM) to communicate with the hub station 106. If the bandwidths used for TDMA and SCPC/FDM overlap, interference cancellation is used to resolve the interference caused by that overlap. See, e.g., S. Jayasimha and J. Paladugula, "Canceling Echoes distorted by Satellite Transponders," Proc. of Natl. Conf. on Comm. (NCC-2006) pp. 112-116, Omega Scientific Publishers, New Delhi, ISBN 81-85399-80-8.

The dimensions (e.g., the diameter for a parabolic antenna or the height and width for a square horn antenna) of an antenna aperture directly control the gain and the beam-width of the main and side lobes of that antenna. The hub antenna 110 is usually much larger than the remote terminal antenna 108, and therefore aperture size and gain are usually much greater for the hub antenna than for the remote terminal antenna 108. The ratio of hub antenna 110 aperture size to remote terminal antenna 108 aperture size is typically 4:1, with the diameter of the hub antenna 110 aperture typically being larger than 4 meters.

The effective aperture, $A_e$, of an antenna is the area of the antenna that is presented to the transmitted or received signal, which is directly related to the size of the antenna. More particularly, the effective aperture, $A_e$, of an antenna is related to the physical aperture, A, of the antenna according to the following relationship:

$$A_e = K_a \cdot A,$$

wherein $K_a$ is the antenna aperture efficiency and A is calculated as the physical area of the antenna (i.e., $\pi \cdot \text{diameter}^2/4$). And, the gain, G, of an antenna is related to the effective aperture, $A_e$, of the antenna by the following relationship:

$$G = 4\pi A_e / \lambda^2.$$

wherein λ is wavelength of the transmitted or received signal. Thus, the gain of the remote terminal antenna 108 will depend on the physical aperture size, A, the antenna aperture efficiency, $K_a$, and the wavelength, λ, of the transmitted or received signal.

The half-power beam-width (HPBW) of an antenna is the angular separation between the half power points on the antenna radiation pattern, where gain, G, is one half the maximum value. The HPBW of an antenna is calculated in radians as:

$$HPBW = \lambda / \sqrt{A_e}.$$

For a conventional parabolic reflector antenna in the 3 decibel (dB) bandwidth of the main lobe and a diameter of 36λ, the HPBW will be slightly less than 0.0524 radians (≈3°), which is slightly less than the typical 3° angular separation, s, of adjacent satellites. Accordingly, a remote terminal antenna 108 with those properties will receive not only signals from the satellite to which it is pointing, but also unwanted signals from adjacent satellites (i.e., Adjacent Satellite Interference (ASI)). ASI occurs in ground terminals with small aperture antennae because the antennae are too small to be able to focus properly on the specific satellite of interest (i.e., pointing errors). ASI is the especially problematic for co-polarized adjacent satellite transponders.

There are three conventional methods for reducing ASI. The first method includes increasing the size of the antenna aperture, A, so the beamwidths decrease. The second method includes aperture tapering to increase side lobe suppression. And, the third method includes using spread-spectrum methods to reduce ASI Power Spectral Density (PSD) according to the bandwidth expansion factor. Each of those methods, however, has drawbacks. For example, larger apertures are not as suitable for mobile applications where aperture size is restricted, hyperbolic aperture illuminations from aperture tapering blow up main lobe beamwidth, and spread-spectrum methods reduce transponder throughput. Accordingly, there is a need for a remote terminal with a reduced aperture antenna that provides equivalent or improved ASI over conventional remote terminal antennae, particularly for mobile applications where aperture size is restricted, such as Man-Pack and SATCOM-on-the-move applications.

BRIEF SUMMARY OF THE INVENTION

Accordingly, to solve at least the problems and/or disadvantages described above, and to provide at least the advantages described below, a non-limiting object of the present invention is to provide a system and method of reducing VSAT apertures via satellite MIMO is disclosed. The system and method of the present invention comprise a first hub antenna configured to receive a first return signal from and to transmit a first forward signal to a first adjacent satellite, a second hub antenna configured to receive a second return signal from and to transmit a second forward signal to a second adjacent satellite, and a hub station configured to determine time delay and frequency shift between the first return signal and the second return signal after they are received by the first hub antenna and the second hub antenna, and to apply the determined time delay and frequency shift to one of the first forward signal and the second forward signal prior to transmitting them so the first forward signal and the second forward signal are time- and frequency-aligned when received at the remote ground terminal via the first adjacent satellite and the second adjacent satellite, wherein the first return signal and the second return signal are transmitted from the remote ground terminal to the first hub antenna and the second hub antenna via the first adjacent satellite and the second adjacent satellite. The remote ground terminal may also be configured to send two or more first polarized signals to the adjacent satellites and to receive the two or more first polarized signals from the adjacent satellites when the adjacent satellites re-transmit the two or more first polarized signals, wherein the remote ground terminal receives the re-transmitted two or more first polarized signals, determines differential delay and frequency shift between the re-transmitted two or more first polarized signals, and applies the determined differential delay and frequency shift to two or more subsequently received second polarized signals so the two or more subsequently received second polarized signals are time- and -frequency aligned for processing at the remote ground terminal. Those and other objects of the invention, as well as many of the intended advantages thereof, will become more readily apparent when reference is made to the following description, taken in conjunction with the accompanying drawings.

BRIEF DESCRIPTION OF THE DRAWINGS

FIG. 11 is table illustrating the power contribution inputs and outputs of the ICs illustrated in FIG. 10;

FIG. 12 is a table illustrating the SINR inputs of the ICs illustrated in FIG. 10.

Reference will now be made in detail to non-limiting embodiments of the present invention by way of reference to the accompanying drawings, wherein like reference numerals refer to like parts, components, and structures.

DETAILED DESCRIPTION OF THE EXEMPLARY EMBODIMENTS

The present invention provides improved ASI and/or gain for reduced-aperture remote ground terminals using multiple-input-multiple-output (MIMO) processing for terrestrial multi-path channels in line-of-sight (LOS) satellite communications. MIMO is the use of multiple antennae at one or both of a transmitter and receiver to improve communication performance. In such a system, however, time delay, $\tau$, and frequency shift (i.e. Doppler shift), $\Delta f$, occur between the multiple path channels. Accordingly, the present invention also equalizes those time delays, $\tau$, and frequency shifts, $\Delta f$, either at the hub station from which the signals are sent or at the remote ground terminal at which the frequency is received, using several novel methodologies.

The amount of transmit power received by an antenna is directly related to that antenna's gain, G, which, as discussed above, is proportional to the area, A, of the antenna's aperture. And, since the area, A, of the antenna's aperture is proportional to the square of the antenna's diameter, reducing the aperture of an antenna by a sizing factor, k, will reduce the gain, G, of that antenna by a factor of $k^2$. When describing the present invention, that sizing factor, k, is used to refer to the factor by which the diameter of a remote terminal antenna in a dual-satellite system can be scaled down with respect to the diameter of a remote terminal antenna in a single-satellite system, while maintaining an equivalent or improved amount of ASI.

In addition, the transmit power received by an antenna from a satellite is proportional to how directly the antenna points at the satellite. As mentioned above, the angular separation, s, between satellites is approximately 3°. Accordingly, when an antenna does not point directly at a satellite, the transmit power received by that antenna should be reduced by a "pointing factor", $m_s(k)$, which is a function of both angular separation, s, and sizing factor, k (i.e. the size of the antenna aperture). The pointing factor, $m_s(k)$, equals 1 when an antenna points directly at a satellite (i.e., when an antenna's boresight and the satellite's direction are collinear). For purposes of describing the present invention, the pointing factor, $m_s(k)$, is used to compare single-satellite and dual-satellite systems in terms of both angular separation, s, and aperture size, k.

Figure 1:
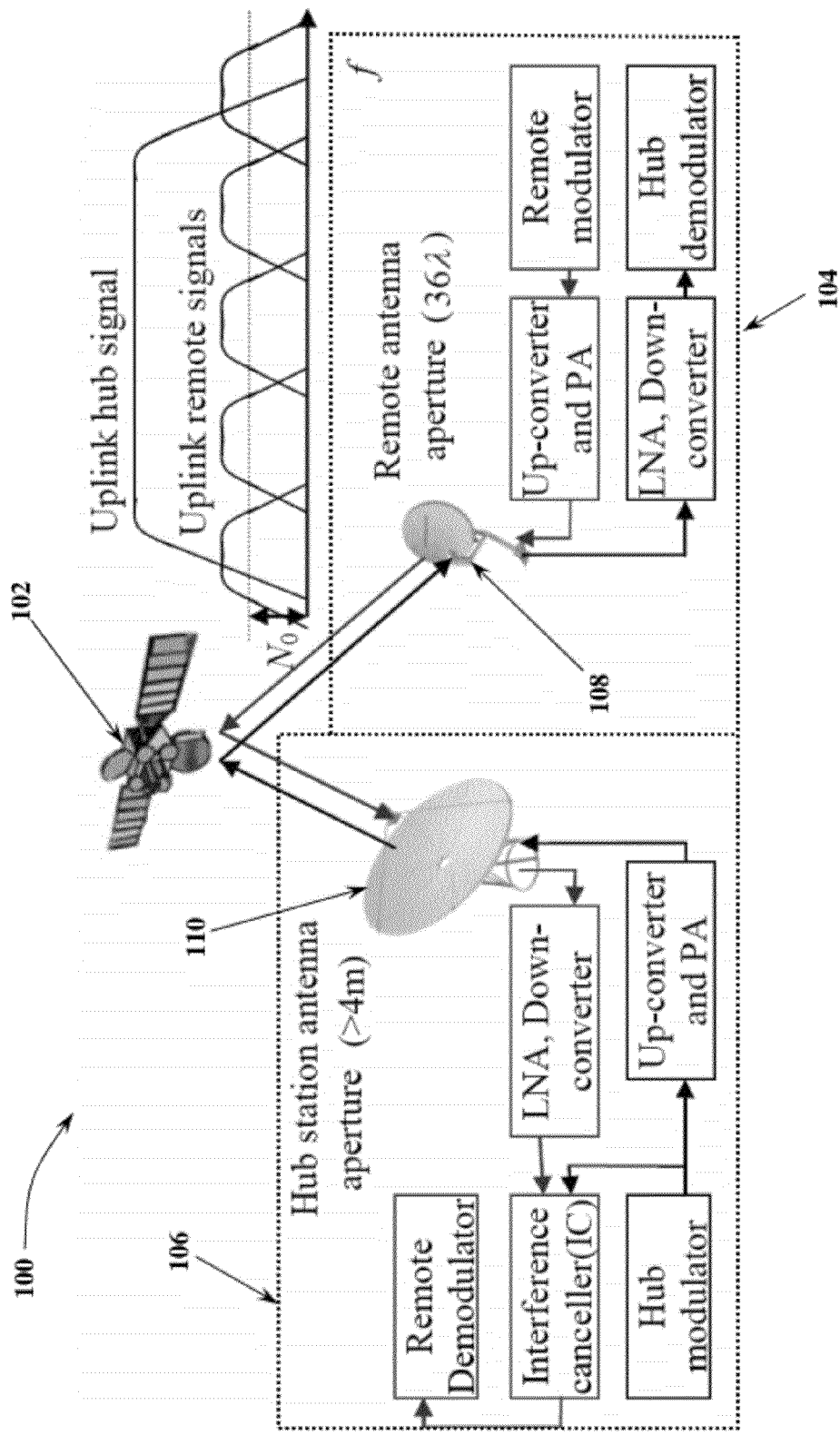
FIG. 1 illustrates a conventional single-satellite system.
Figure 2:
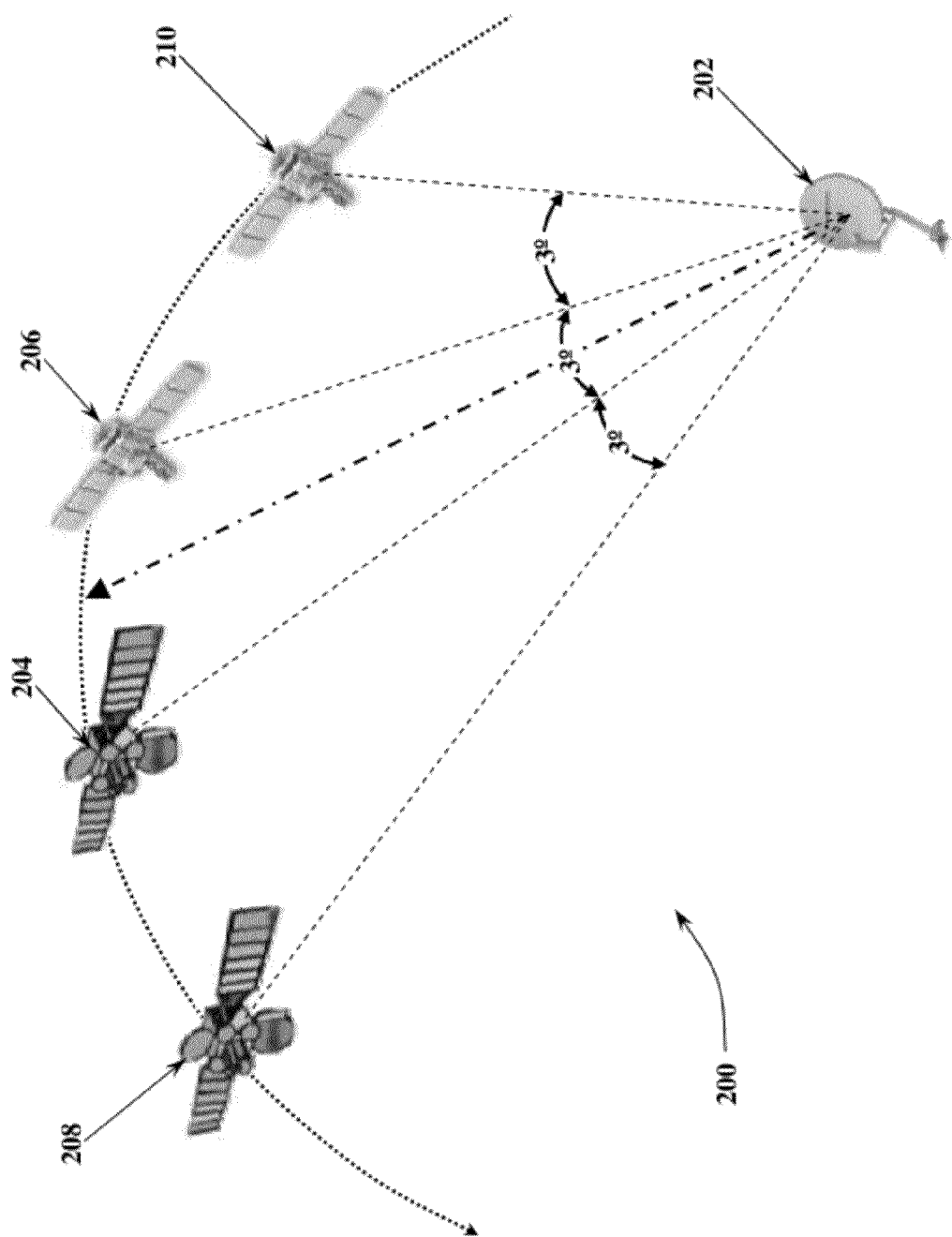
FIG. 2 illustrates the angular separation and pointing location for a dual-satellite system.

As FIG. 2 illustrates, the remote terminal antenna 202 in a dual-satellite system 200 points to the midpoint between two target satellites 204 and 206 (i.e., the satellites to which the remote terminal antenna 202 is configured to send signals, and from which the remote terminal antenna 202 is configured to receive signals). Accordingly, the transmit power received at the remote terminal antenna 202 from each of those satellites 204 and 206 is scaled by a pointing factor, $m_{0.5\,s}(k)$, wherein the angular separation from the location the remote terminal antenna 202 is pointing is half the angular separation, s, of the satellites 204 and 206 (i.e., 0.5 s). Accordingly, the gain of the remote terminal antenna for each terminal will be reduced by the scaling factor $m_{0.5\,s}(k)$. But, because the remote terminal antenna 202 is receiving transmit power from two satellites 204 and 206 in the dual-satellite system 200, the transmit power of both of those satellites 204 and 206 is summed to double the amount of transmit power received by the remote terminal antenna 202 (i.e., $2 \cdot m_{0.5\,s}(k)$). And, because transmit power is directly related to gain and gain will increase proportional to $k^2$, the remote terminal antenna 202 in a dual-satellite system 200 utilizing satellites 204 and 206 with identical transmit power will still receive the same total signal power as the remote terminal antenna 108 in a single-satellite system 100 when $(k)=\sqrt{2m_{0.5\,s}(k)}$ (i.e., when the aperture of the remote terminal antenna 202 in the dual-satellite system 200 is smaller than the remote terminal antenna 108 in a single-satellite system 100 by a sizing factor, k, equal to $\sqrt{2m_{0.5\,s}(k)}$). Since the solution of $k=\sqrt{2m_{0.5\,s}(k)}$ is less than 1, a dual-satellite system 200 can achieve the same gain with a smaller aperture remote terminal antenna 202 than in a single satellite system by obtaining transmit power from both satellites 204 and 206 without altering those satellites' power and/or bandwidth.

ASI in a dual-satellite system 200 is proportional to the transmit power of the signal path of non-target, adjacent satellites 208 and 210 that have an angular separation of 1.5 s from the location the remote terminal antenna 202 is pointing. The ASI from the adjacent satellites 208 and 210 is therefore $m_{1.5\,s}(k)$, which is less than that of a single-satellite system where the adjacent satellites have less angular separation (i.e., $m_{1,0\ s}(k)$). Thus, the increased angular separation, s, in a dual-satellite system 200 reduces the ASI that occurs at the remote terminal antenna 108.

Because ASI is reduced in a dual-satellite system 200, the aperture of the remote terminal antenna 202 in the dual-satellite system 200 can also be reduced. The aperture of the remote terminal 202 can be reduced by a factor of k with respect to that of a remote terminal antenna 108 in a single satellite system 100 while maintaining the an equivalent or smaller amount of ASI with respect to the single-satellite system 100. Main-lobe roll-off for such antennae is even convex-∩, usually nearly $\cos^n \theta$, or $[1-\theta^2/2]^n$ for small θ, wherein θ equals angular separation (e.g., 0.5 s, s, or 1.5 s) and n equals π divided by the first null beam-width. Accordingly, the sizing factor, k, is calculated as:

$$k = \sqrt{2(1-0.125s^2)^{kn}},$$

and, the ASI ratio, ρ, of the single-satellite system 100 to the dual-satellite system 200 is calculated as:

$$\rho \approx \frac{(1-0.5s^2)^n}{(1-1.125s^2)^{kn}},$$

wherein the aperture has been reduced by $k^2$. Accordingly, ρ is greater than 1 (i.e., ASI is reduced for the dual-satellite system 200) when:

$$k \leq \frac{\log(1-0.5s^2)}{\log(1-1.125s^2)}.$$

Thus, for an angular separation, s, of 3°, ρ is greater than 1 whenever k≦0.4441 (i.e., ASI will be reduced or equal in the dual-satellite system 200 as long as the aperture of its remote terminal antenna 202 is not more than 0.4441 times smaller than the aperture of the remote terminal antenna 108 of the single-satellite system 100). And, a remote terminal antenna 202 in a dual-satellite system 200 will have the same uplink gain as a remote terminal antenna 108 in a single-satellite system 100 for $1 > k > 2^{-0.5}$ and with ASI dependent only on k. Accordingly, a remote terminal antenna 202 in a dual-satellite system 200 can be provided with the same uplink gain, reduced gain, and reduced aperture size compared to a remote terminal antenna 108 in a single satellite system 100.

Figure 3:
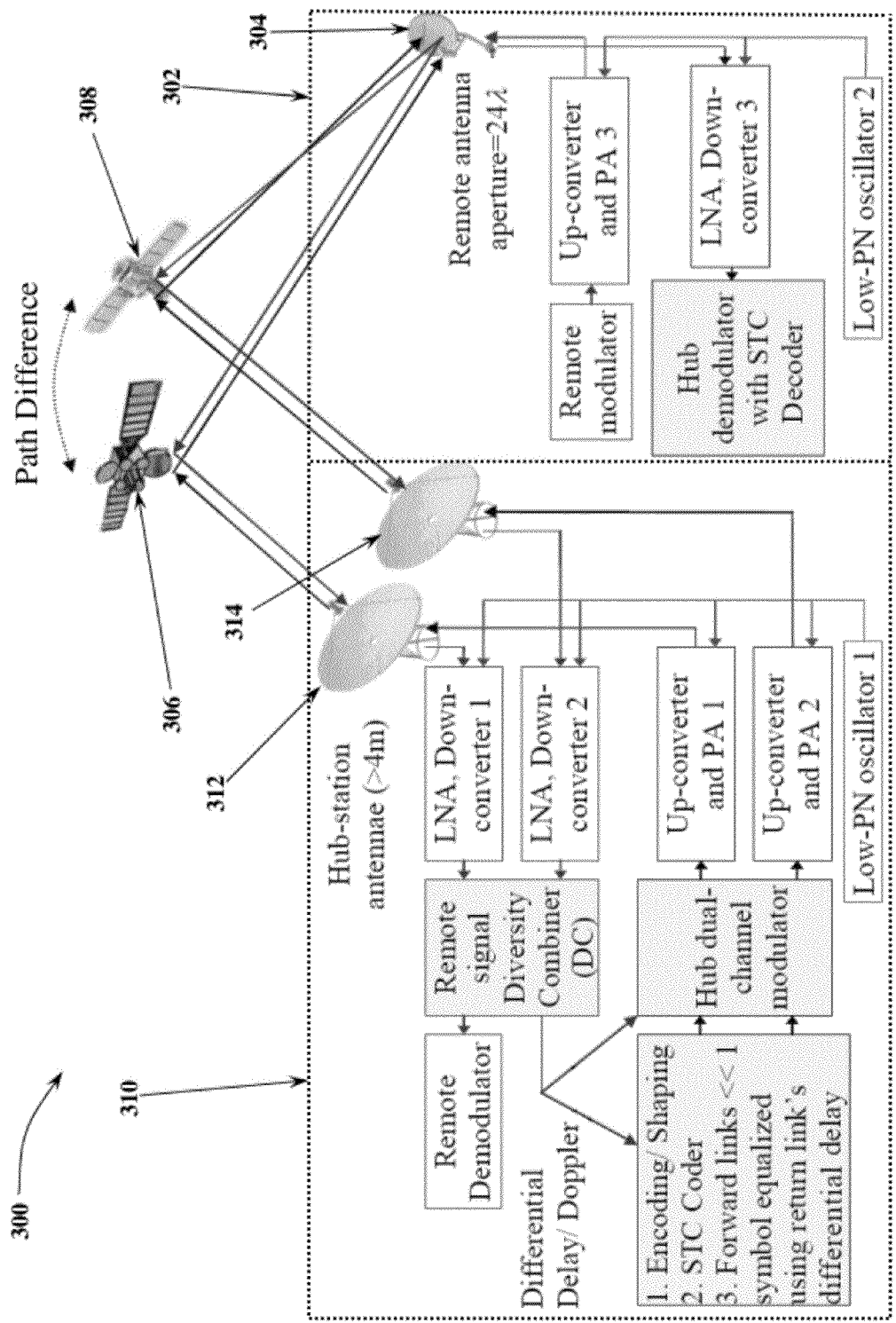
FIG. 3 illustrates a dual-satellite system according to one non-limiting embodiment of the present invention.
Figure 8:
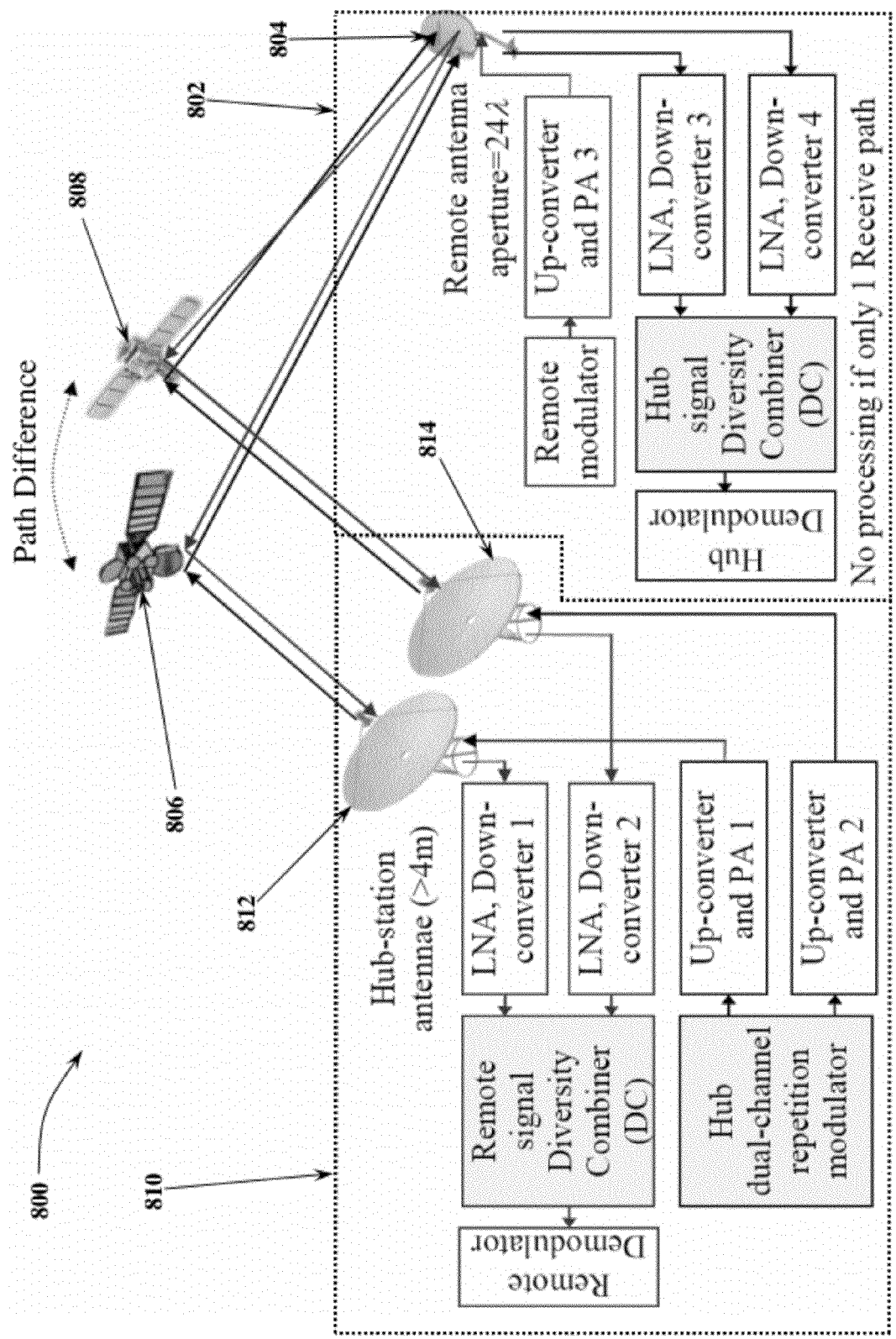
FIG. 8 illustrates a dual-satellite system according to another non-limiting embodiment of the present invention.

FIGS. 3 and 8 illustrate a non-limiting exemplary embodiments of dual-satellite systems 300 and 800 according to the present invention. The dual satellite systems 300 and 800 both utilize MIMO processing for terrestrial multi-path channels in LOS satellite communications. As discussed above, those dual-satellite systems 300 and 800 can be used to reduce the aperture size of the antenna 304 or 804 at a remote ground terminal 302 or 802 (e.g., a Very Small Aperture Terminal (VSAT)) as compared to the aperture of a remote terminal antenna 108 in a single satellite system 100 while maintaining or reducing the amount of ASI.

In accordance with the present invention, each dual-satellite system 300 and 800 includes a hub terminal 310 or 810 with at least two corresponding hub antennae 312 and 314 for communicating with a remote ground terminal 302 or 802 with a reduced-aperture remote terminal antenna 304 and 804. Each remote terminal antennae 304 or 804, each satellite pair 306 and 308 or 806 and 808, and each hub antenna pair 312 and 314 or 812 and 814, form at least two point-to-point forward links (e.g., one from the first hub antenna 312 or 812 to the remote terminal antenna 304 or 804 via the first satellite 306 or 806, and another from the second hub antenna 314 or 814 to the remote terminal antenna 304 or 804 via the second satellite 308 or 808) and one point-to-multipoint return link (e.g., from the remote terminal antenna 304 or 804 to the at two hub antenna pair 312 and 314 or 812 and 814 via each of the at least two satellites 306 and 308).

Although MIMO allows the aperture size of the remote terminal antenna 304 or 804 in a dual-satellite system 300 to be reduced as compared to the aperture size of a remote terminal antenna 108 in a single satellite system 100 while maintaining or reducing the amount of ASI, such dual-satellite configurations result in time delays, τ., and frequency shifts (i.e., Doppler shifts), Δf, in the forward links and return links due to movement of the remote ground terminal 302 or 802, the satellites 306 and 308, and/or the hub station 310 or 810. Different time delays, τ., and frequency shifts, Δf, may also occur due to ionospheric effects. Accordingly, the present invention also provides a system and method for negating those time delays, τ., and frequency shifts, Δf, using interference cancellation either at the hub terminal 310 (FIG. 3) for point-to-point forward links employing Space-Time Coding (STC) or at the remote ground terminal 802 (FIG. 8) for the point-to-multipoint return links employing Polarization Diversity (PD).

In the embodiments shown, the operation of the remote ground terminals 302 and 802 and the hub stations 310 and 810 are preferably implemented by any suitable computing processor or processing platform that is capable of performing the functions and operations in accordance with the invention. The computing platform is preferably, for instance, a FPGA (Field programmable Gate array) or an ASIC (Application-Specific Integrated Circuit) either in a stand alone system or fully integrated with the modulator or demodulator. All or part of the systems and processes can be stored on or read from a memory or computer readable media.

Point-to-Point Forward Links Employing STC

As FIG. 3 illustrates, the dual-satellite system 300 according to one embodiment of the present invention includes a remote ground terminal 302 with a receive chain comprising a Low-Noise Amplifiers (LNA) and down-converter followed by a demodulator with an STC decoder, and a transmit chain comprising a modulator followed by an up-converter and Power Amplifier (PA). The remote ground terminal 302 also includes a Low Phase Noise (PN) Oscillator for frequency conversion in the receive chain and the transmit chain. The remote terminal antenna 304 is a Transmit and Receive (T/R) antenna that is pointed between the two satellites 306 and 308 as illustrated in FIG. 2.

The dual-satellite system 300 also includes a hub station 310 with a receive chain comprising an LNA and down-converter for each hub antenna 312 and 314 followed by a Diversity Combiner (DC) and a demodulator, and a transmit chain comprising an STC coder followed by a dual-channel modulator and an up-converter and PA for each hub antenna 312 and 314. The hub station 310 also includes a Low-PN Oscillator for frequency conversion in the receive chain and the transmit chain. The hub antennae 312 and 314 are each T/R antennae pointed at one of the adjacent satellites 306 and 308, respectively.

Using those components, or their equivalents, a combination of Satellite Diversity (SD) and STC can be used at the hub terminal 310 to modify the signals sent from each hub antenna 312 and 314 to the remote terminal antenna 304 prior to sending those signals. Because the two satellites 306 and 308 will move at the same rate with respect to the remote ground terminal 302 and the hub station 310, the forward channel (i.e., the signal from the hub station 310 to the remote ground terminal 302) will have the same time delay, $\tau$., and frequency shift, $\Delta f$, as the return channel (i.e., the signal from the remote ground terminal 302 to the hub station 310). But, because the two satellites 306 and 308 are at an angular separation, s, those satellites have a path difference with respect to each other, and the time delay, $\tau$., and frequency shift, $\Delta f$, for one satellite 306 will be different from the other 308.

At the hub station 310, the DC The Accordingly, in addition to diversity combining the two signals with the DC at the hub station 310 and providing them to the demodulator for data extraction, the present invention also calculates the time delay, $\tau$., and frequency shift, $\Delta f$, for each satellite 306 and 308 with the DC at the hub station 310.

After the signals are received and down-converted to a suitable baseband or intermediate frequency, the DC weights and sums the inputs from an Interference Canceller's (IC's) subtraction for signal overlap in the return channels to determine the time delay, $\tau$., and frequency shift, $\Delta f$, between the signals sent to the two hub antennae 312 and 314 in the return channels. That method of calculating time delays, $\tau$., and frequency shifts, $\Delta f$, is described, for example, by S. Jayasimha and J. Paladugula, "Interference Cancellation in Satcom and Ranging," Proc. of Natl. Conf. on Comm. (NCC-2008) pp. 84-88, Allied Publishers, Mumbai, ISBN 979-81-8424-284-2, which is incorporated as if fully set forth herein. Diversity combining of the two signals with such a method places the signals in condition for demodulation/data extraction at the hub station 310.

Using the same values for time delay, $\tau$., and frequency shift, $\Delta f$, calculated for the return channels, the present invention can time- and frequency-shift one or more signals in the forward channels (e.g., the forward channel from the first hub antenna 312 to the remote terminal antenna 304 via the first satellite 306) at the hub station 310 before applying STC coding so that all of the signals sent via the forward channels will arrive at the remote terminal antenna 304 at the same time and with the same frequency delay (i.e., signal sent from the first hub antenna 312 to the remote terminal antenna 304 via the first satellite 306 will arrive at the same time and with the same frequency as the signal sent from the second hub antenna 314 to the remote terminal antenna 304 via the second satellite 308). Thus, by time- and frequency-aligning those signals (via the return channel) as they are sent to the remote ground terminal 302, many of the processing challenges that would otherwise occur with the STC receivers at the remote ground terminal 302 are resolved.

Figures 4, 5:
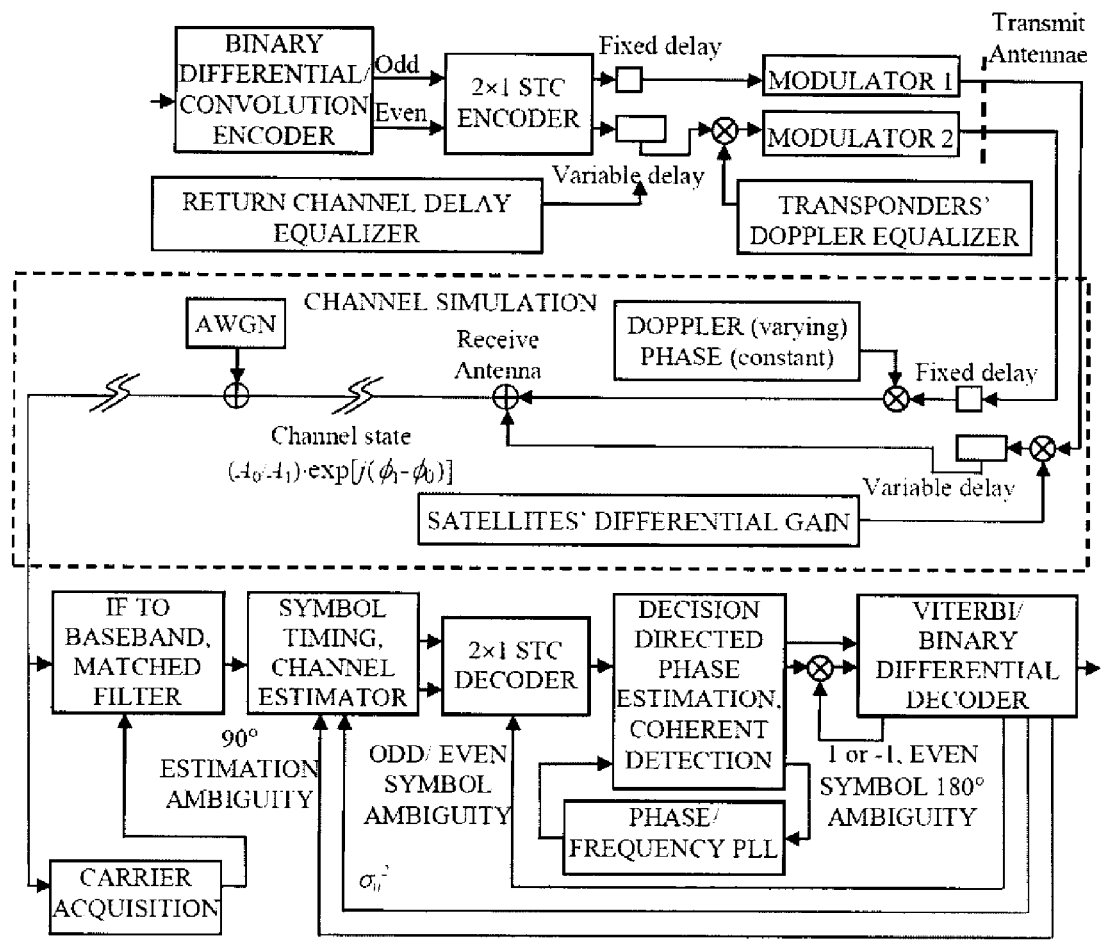
FIG. 4 is schematic diagram illustrating an exemplary process for compensating for time delay and frequency shift in the dual-satellite system illustrated in FIG. 3.
FIG. 5 is table illustrating exemplary 2×1 STC encoding processed by the process illustrated in FIG. 4.

As FIG. 4 illustrates, one possible process for compensating for time delay, $\tau$., and frequency shift, $\Delta f$, in a forward channel when using STC in a dual-satellite system 300 (assuming that time delays are small compared to the symbol interval and the two channels have equal transponder power) includes using Binary Phase-Shift Keying (BPSK) to calculate the phase shift between the forward channels with blind estimation (i.e., without training data) and tracking time delay and phase changes with a $2^{nd}$-order control loop. Phase ambiguity can be resolved using a Viterbi decoder. Using the process illustrated in FIG. 4, BPSK can be used with 2×1 STC coding as illustrated in FIG. 5. And, because path gains for equal transponder power and input back-off are nearly equal in a dual-satellite system 300, only phase and phase shift need to be estimated prior to STC coding at the hub station 310.

Figure 6:
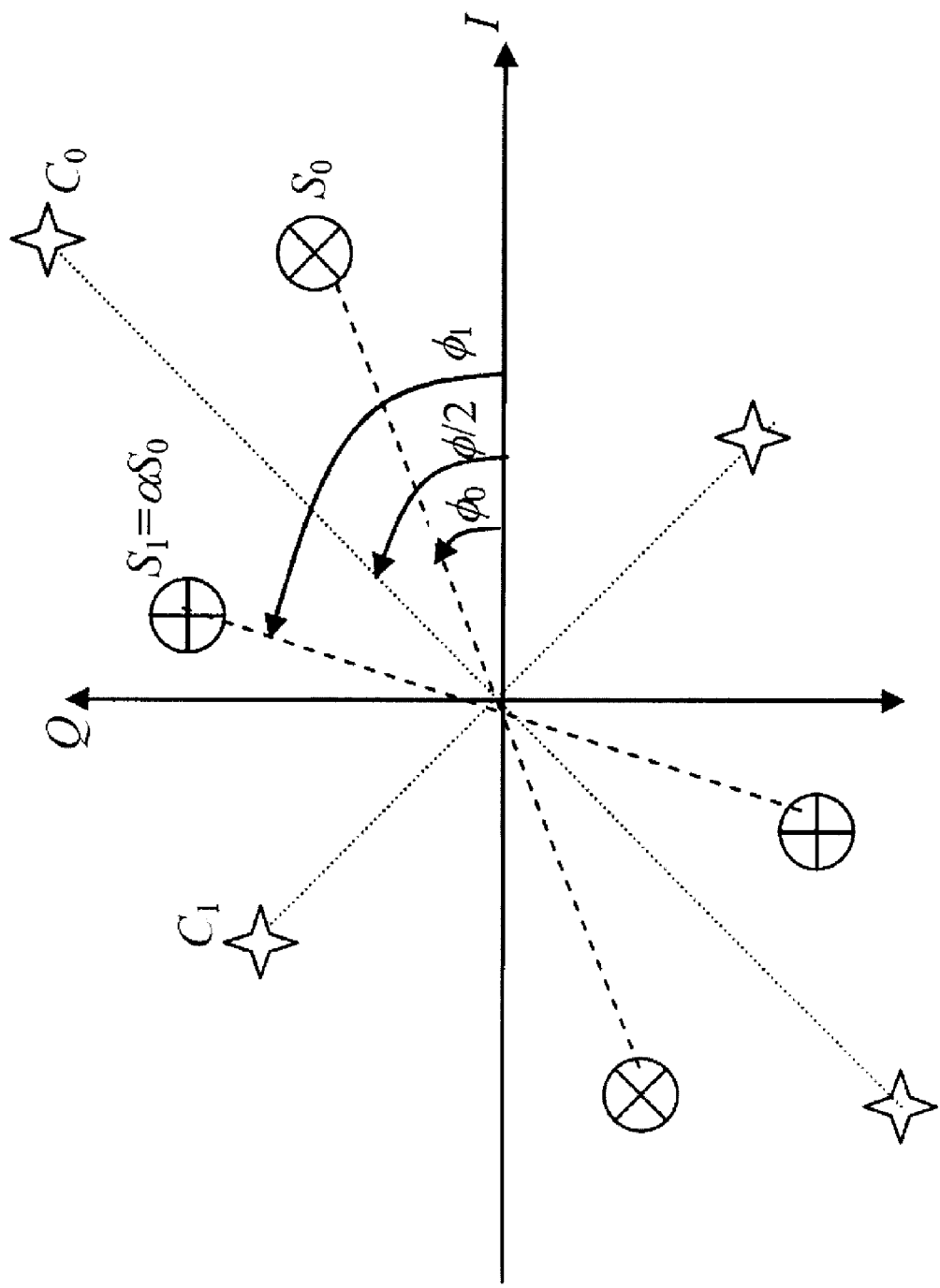
FIG. 6 is a graph illustrating an exemplary quaternary received signal constellation using BPSK with the 2×1 STC coding illustrated in FIG. 5.

As FIG. 6 illustrates, for two BPSK-transmitted signals, $S_0$ and $S_1$, the quaternary received signal constellation (at corners of a parallelogram) are distant $C_0$ and $C_1$ from the origin, wherein the slowly varying channel states are $\Phi_0$ and $\Phi_1$, respectively. Accordingly, the channel variable, $\Phi_0 + \Phi_1$, can be estimated independent of the return channels' differential attenuation, $\nu$, using high order statistics on the received signals, $R_0$ and $R_1$, which includes first estimating the STC constellation radii as:

$$C_0^2, C_1^2 = \{E[R_k^2] - \sigma_n^2\} \pm \{\{E[R_k^2] - \sigma_n^2\}^2 - \{E[R_k^2] - E[(R_k - R_{k-1})^2]\}^2\}^{1/2},$$

wherein $\sigma_n^2$ is the noise variance (e.g., a Viterbi decoder estimate) and $I_k$ is the real part of $R_k$, and which yields:

$$\phi = \cos^{-1}\left\{\frac{4E[I_k^2] - (C_0^2 + C_1^2) - 2\sigma_n^2}{(C_0^2 - C_1^2)}\right\}$$

A Viterbi decoder's node synchronization can then be used to resolve that estimate's phase ambiguity of $\pi/2$ ($C_0$ may be swapped $2^{nd}$ with $C_1$) during acquisition or cycle-slip. For any M-symmetric constellation, those two equations may be generalized to obtain phase with ambiguity of $\pi/M$. For example, M=4 for 16-QAM. The $2^{nd}$-order phase-locked loop is then used to track slowly varying phase and phase shift.

Figure 7:
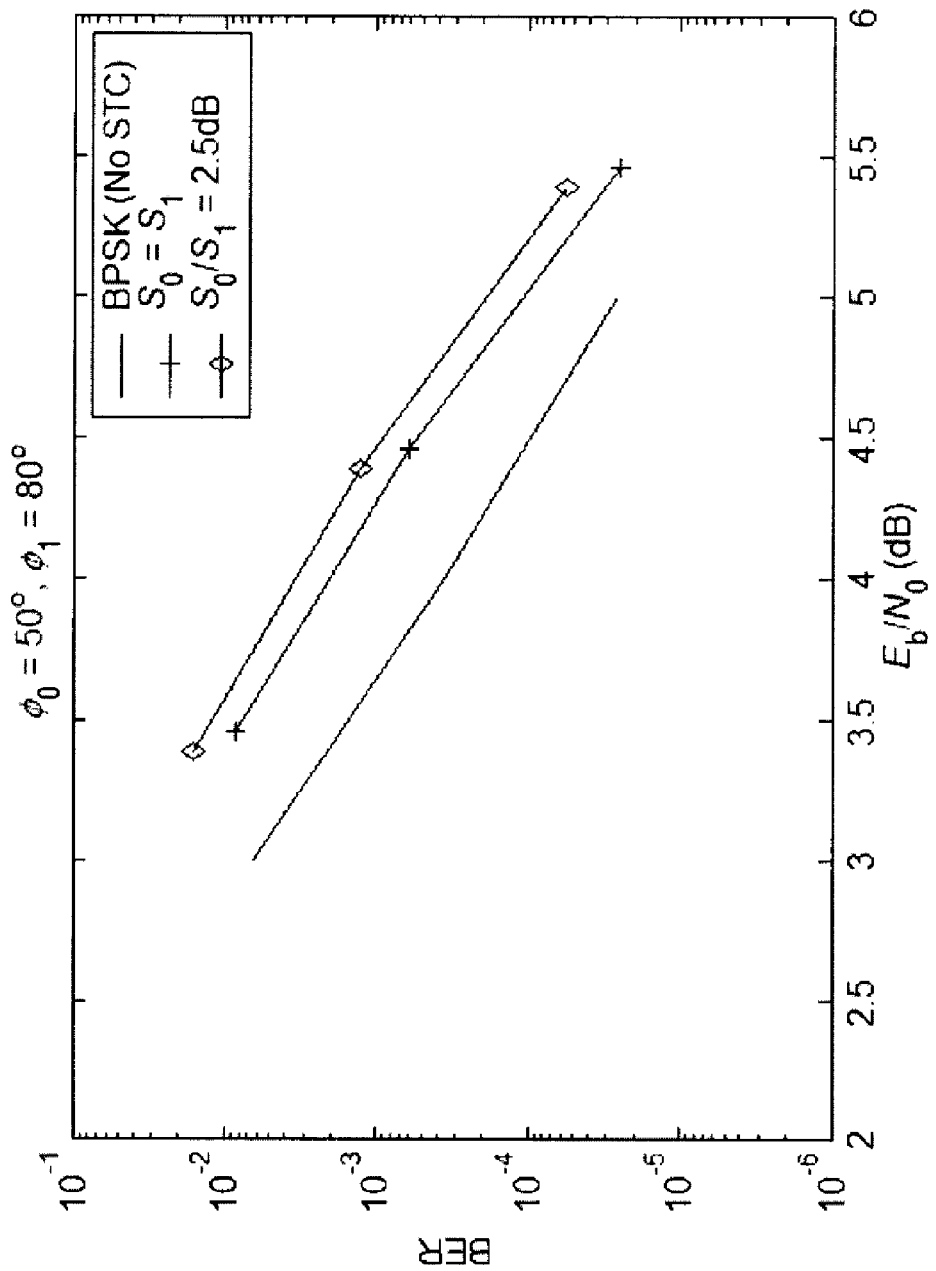
FIG. 7 is a graph of the performance of the dual-satellite system illustrated in FIG. 1.

The receiver combining, $\hat{S}_{2k}$ and $\hat{S}_{2k+1}$, for the 2×1 STC of FIG. 5 for a symbol pair, $R_{2k}$ and $R_{2k+1}$, is:

$$\hat{S}_{2k} = R_{2k} + \alpha e^{j\Phi} R^*_{2k+1}$$

and $$\hat{S}_{2k+1} = (\alpha e^{-j\Phi} R_{2k} - R^*_{2k+1})^*,$$

wherein $\alpha$ is a factor that accounts for any difference in gain between the two satellites 306 and 308. Thus, $\alpha \approx 1$ for equal transponder power, particularly at lower frequencies, (e.g., the C-band). Thus, as FIG. 7 illustrates, using the receiver combining of the present invention in a dual-satellite system 300 to improve gain and/or ASI in a reduced-aperture remote terminal antenna 304 only results in a small loss in performance (e.g., 0.8 dB, wherein performance is measured in terms of Bit Error Rate (BER) and $E_b/N_0$ gain, and wherein $E_b$ is energy per symbol/number of bits per symbol and $N_0$ is spectral density) over a single-satellite system 100 using BPSK. That performance loss was calculated for 0.5 bps/Hz system and includes the midpoint pointing loss, $m_{0.5\,s}(k)$, that occurs in the dual-satellite system 300. Moreover, the performance loss remains small even when the gains of the signal paths are actually mismatched by 2.5 dB but assumed to be equal. Such a small amount of performance loss is effectively negligible when compared to the improvements in gain and/or ASI achieved by the dual-satellite system 300.

Point-to-Multipoint Return Links Employing PD

As FIG. 8 illustrates, the dual-satellite system 800 according to another embodiment of the present invention includes a receive chain comprising a remote ground terminal 802 with an LNA and down-converter for each polarization receiver/transmitter 900 and 902 (FIG. 9) followed by a DC and a demodulator, and a transmit chain comprising a modulator followed by an up-converter and PA. The remote ground terminal 802 in this embodiment does not need an STC decoder and will not perform any processing if only one polarized signal is received. The remote terminal antenna 804 is a single antenna with dual-polarization receivers and transmitters 900 and 902 for receiving and transmitting polarized signals to and from the adjacent satellites 806 and 808.

The dual-satellite system 800 also includes a hub station 810 with a receive chain comprising an LNA and down-converter for each hub antenna 812 and 814 followed by a Diversity Combiner (DC) and a demodulator, and a transmit chain comprising a dual-channel modulator and an up-converter and PA for each hub antenna 812 and 814. The hub station 310 also does not need an STC decoder. The hub antennae 812 and 814 are each T/R antennae configured to transmit and receive signals of different polarity with respect to the other antenna and are each pointed at one of the adjacent satellites 806 and 808, respectively, each of which are similarly configured to transmit and receive signals with different polarity with respect to the other satellite.

Using those components, or their equivalents, a combination of SD and PD can be used at a remote ground terminal 802 to modify the signals sent from each hub antenna 812 and 814 to the remote terminal antenna 304 after they are received at the remote ground terminal 802. As described above, each satellite 806 and 808 moves at the same rate with respect to the remote ground terminal 802 and hub station 810 so that the signals sent via each return link experience the same time delay, $\tau$, and frequency shift, $\Delta f$, as the signals sent via the corresponding forward link. But, because the two satellites 806 and 808 are at an angular separation, s, those satellites have a path difference with respect to each other, and the time delay, $\tau$, and frequency shift, $\Delta f$, for one satellite 806 will be different from the other satellite 808. Accordingly, the present invention uses PD to send a pair of orthogonally polarized signals from the remote ground terminal 802 to the two satellites 806 and 808.

PD allows two orthogonally polarized signals to be sent from and received by a single remote terminal antenna 304 with dual-polarization receivers and transmitters 900 and 902. And, to relay those signals, the two satellites 806 and 808 are provided with transponders configured to only transmit one polarization at a time, with the transponder at one satellite 806 being configured to transmit a signal with a polarization orthogonal to that of the transponder at the other satellite 808. For example, Global C-band A and B transponders may be provided for Intelsat satellites. Accordingly, two orthogonally polarized signals replicated and up-converted at the hub station 810, transmitted by the hub antennae 812 and 814 to the corresponding satellites 806 and 808, repeated by the transponders of each of the two satellites 806 and 808 to relay them to the respective hub antennae 812 and 814, and then received by the dual-polarization receivers and transmitters 900 and 902 at the remote terminal antenna 304.

Using the repeated signals received at that remote terminal antenna 304, the remote ground terminal 802 down converts the signals to a suitable baseband or intermediate frequency and determines the time delay, $\tau$, and frequency shift, $\Delta f$, between the return channels with a DC and an IC at the remote ground terminal 802 in a similar manner to that described above. Based on the determined time delay, $\tau$, and frequency shift, $\Delta f$, the remote ground terminal 802 can compensate for those differences between the two forward channels as signals are received at the remote ground terminal 802 via the forward channels. Thus, by time- and frequency-aligning those signals as they are received at the remote ground terminal 802, the need for symbol-timing recovery at the remote ground terminal 802 is eliminated, which allows the use of a dual-satellite system 300 to reduce ASI and/or increasing gain at a remote ground terminal 802 with a reduced-aperture remote terminal antenna 304. Moreover, it allows the remote ground terminal 802 to use an off-the-shelf post-DC demodulator, which decreases the cost of the remote ground terminal 802 and helps offset the cost of leasing a second satellite transponder. The two transponders should each have the same downlink power as a single transponder would in a single-satellite system 100.

Figure 9:
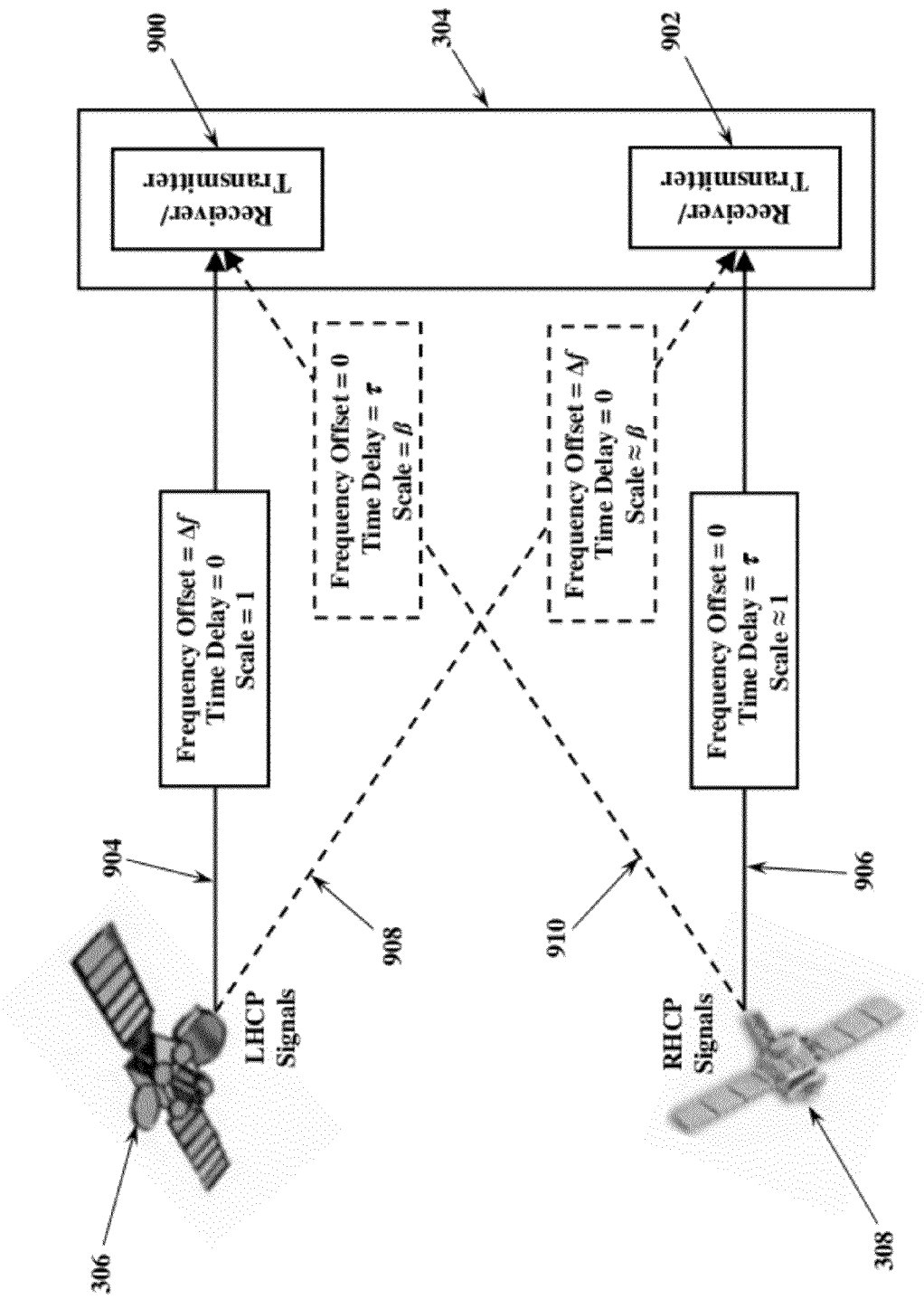
FIG. 9 illustrates co-polar and cross-polar signal paths according to the dual-satellite system illustrated in FIG. 8.

Because two polarized signals are sent to the ground terminal antenna 304 in a dual-satellite system 300 using PD, each polarization receiver 900 and 902 at the ground terminal antenna 304 will receive both polarized signals. Although the polarization receivers 900 and 902 at the ground terminal antenna 304 are configured to only receive signals of a specific polarization (i.e., signals that are co-polar with that receiver 900 or 902), they also receive depolarized portions of signals of different polarizations (i.e., signals that are cross-polar with that receiver 900 or 902) in the form of interference, or cross-talk. Thus, as FIG. 9 illustrates, each polarization receiver 900 and 902 will receive the dominant component 904 or 906 of co-polar signal from one satellite 806 or 309 and a residual, interference component 908 or 910 from the cross-polar signal of the other satellite 808. And, because the path differences between the satellites 806 and 808 sending those polarized signals create a time delays, $\tau$, and frequency shifts, $\Delta f$, the cross-polarized signals that occur in the dual-satellite system 800 will also have a time delay, $\tau$. Moreover, the interference caused by each cross-polar signal will be scaled based on each signal's amplitude, $\beta$.

Cross-polarization discrimination (XPD) is a measure of the amount of interference between signals in terms of the strength of a cross-polar signal that is received compared to the strength of the co-polar signal that is received. XPD for a reduced-aperture remote ground terminal 802 (e.g., a VSAT with an aperture size of 0.9-2.4 m) is typically around 21 dB. One source of the type of depolarization that causes XPD in such a system is weather conditions. For example, because raindrops and ice crystals are non-spherical, they depolarize satellite signals as those signals pass through the raindrops and ice crystals.

Rain XPD severity depends on rain accumulation rate (e.g., millimeters of accumulation per hour). But, the XPD severity for the upper-atmosphere ice crystal clouds and ice particles atop rain clouds cannot be determined based on a ground-measured accumulation rate. Accordingly, site-specific depolarization is described as fraction of time over which an XPD threshold is crossed. At most sites, XPD is −15 dB less than 0.01% of the time. Rain, with associated absorption, scattering, etc., causes co-polarization attenuation (CPA). The relation of XPD to CPA depends on signal frequency, elevation angle, polarization, and raindrop canting angles' spatio-temporal spread. Although actual fade may be large, typical fade rates can be compensated for with uplink power control, wherein the frequency-dependent residual rain-fade margin is 1-3 dB.

In conventional systems, fade is compensated for with uplink power by a single-parameter method with an attack time of about 1 second at sites with XPD=−12 dB (e.g., for Ku-band, ≈10 cm/hr rain rate) less than 0.01% of the time. By contrast, the present invention uses a fast-acting interference-measurement based method to compensate for XPD degradation—particularly for higher order modulation (i.e., high carrier-to-noise ratio)—and to reduce the downlink rain-fade margin. That method is facilitated by the dual-satellite system's 800 use of adjacent satellites 806 and 808 with transponders configured to have opposite circular polarizations and a remote ground terminal 802 with a parabolic remote terminal antenna 304 with dual-polarization receivers and transmitters 900 and 902 (i.e., a 4-pole feed).

When XPD is sufficiently small, information is simply replicated (i.e., using repetition encoding) at the hub station 810 without any time delay, $\tau$. A DC and a single IC (i.e., $IC_1$) at the remote ground terminal 802 are then used to determine time delay and frequency and phase shifts for the received signals. The remote ground terminal 802 then time-, frequency-, and phase-aligns the two dominant received signals prior to diversity combining those signals, as described above. Using simple repetition encoding and single IC-based diversity combining, however, is only sufficient for addressing XPD for low-order modulations.

Although 2×2 STC with time alignment using trellis decoding has been used to minimize performance losses from the depolarizing affects of rain and ice for high-order modulations, the complexity of that method increases as the time delay, $\tau$, from differential propagation increases. Moreover, that method does not compensate for the frequency shifts, $\Delta f$, inherent in a dual-satellite system 800 or in rapid mobility systems. Accordingly, the present invention employs several more ICs (e.g., six) at the remote ground terminal 802 to help offset the negative affects of such weather. The remote ground terminal 802 also employs orthogonally polarized signals, such as Right- and Left-Handed Circularly Polarized (RHCP and LHCP) signals, to obtain decoupling between the channels and compensate for the depolarizing affects of rain and ice. The remote ground terminal 802 may also employ vertical and horizontal polarized signals (i.e., VH polarization) with similar or improved results to those described below for RHCP and LHCP.

Figure 10:
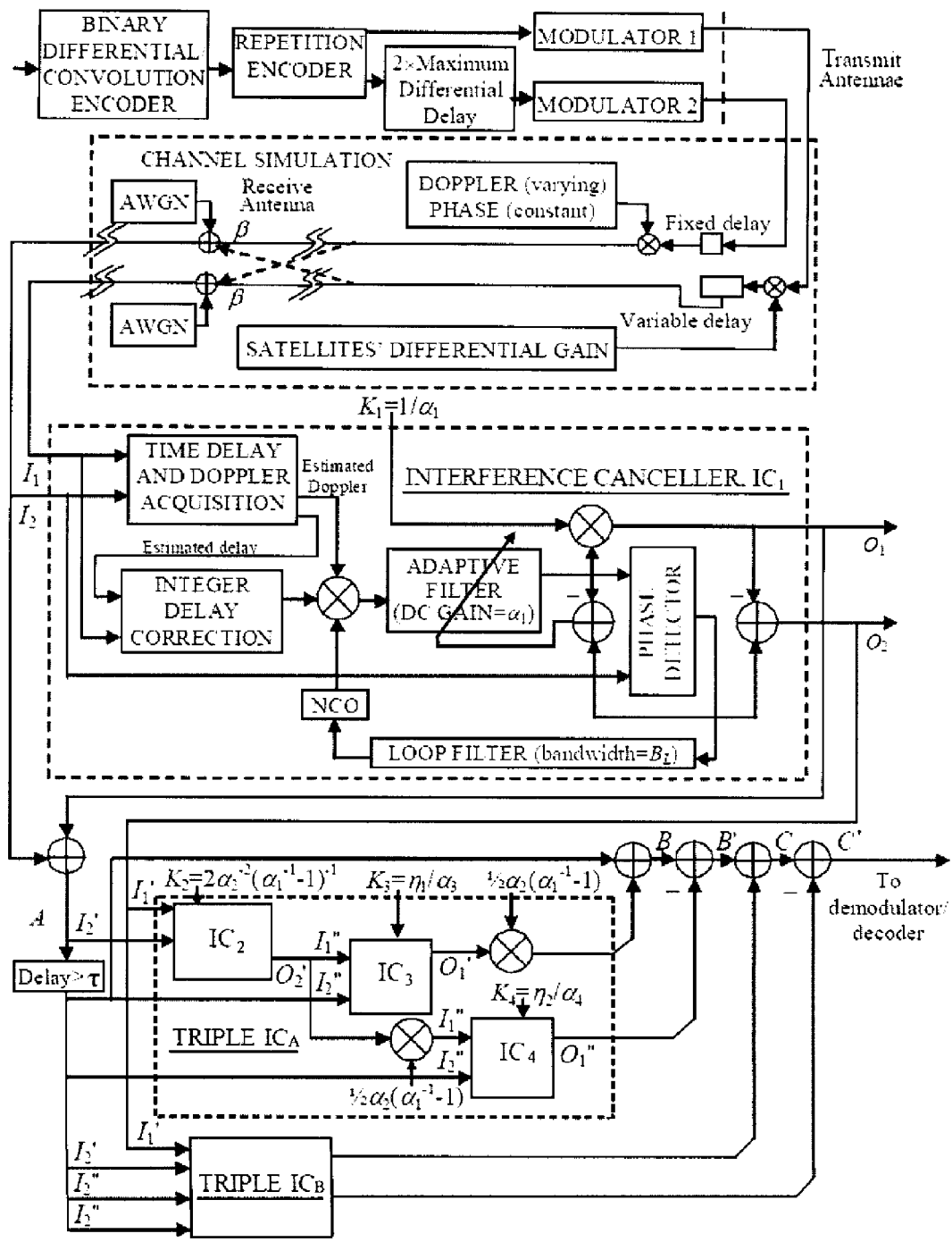
FIG. 10 is schematic diagram illustrating an exemplary process for compensating for XPD in the dual-satellite system illustrated in FIG. 8.

FIG. 10 illustrates one possible process according to the present invention for optimizing diversity combining with RHCP and LHCP to address XPD for high-order modulations in a dual-satellite system 800. That process includes offsetting a repetition encoder's output streams at the hub station 504 by a fixed time, $\tau_{fixed}$, that is slightly longer than the maximum time delay, $\tau_{max}$, between channels to ensure that one channel's dominant component 904 is received at the remote ground terminal 802 later than the other channel's dominant component 906. The signals received via each channel can then be auto-correlated at the remote ground terminal 802 to identify the dominant component 904 or 906 in each signal (i.e., to separate the dominant components 904 and 906 from the associated distortion caused by the interference components 910 or 908 of their respective cross-polar signals) using a time-frequency ambiguity function (e.g., $\chi(\tau, \Delta f) = \delta(\tau)\delta(\Delta f)$ for unit variance white noise inputs, wherein $\delta(x)$ is a two-dimensional Dirac delta function, or "thumbtack" function). The time-frequency ambiguity function will peak at $-\tau_{fixed}-\tau_{max}$ (magnitude $\beta^2$), 0 (magnitude $2\beta$), and $\tau_{fixed}+\tau_{max}$ (magnitude 1), wherein $\tau_{max} < |\tau_{fixed}|$ (assuming the transmitted sequence's auto-correlation is single valued at lag 0). Accordingly, the values for the frequency shift, $\Delta f$, and time delay, $\tau$, between the dominant component 904 of the LHCP signal and the dominant component 906 of the RHCP signal can be determined using diversity combining and interference cancellation at the remote ground terminal 802.

Based on those calculations, the RHCP signal's interference component 910 is time- and frequency-aligned at the remote ground terminal 802 so it can be cancelled from the LHCP signal's dominant component 904. Likewise, the LHCP signal's interference component 908 is time- and frequency-adjusted at the remote ground terminal 802 so it can be cancelled from the RHCP signal's dominant component 906. And, as FIG. 9 illustrates, the RHCP signal's interference component 910 has a nominal frequency offset of $-\Delta f$ and time delay of $\tau$ with respect to the LHCP signal's dominant component 904, and the LHCP signal's interference component 908 has a nominal frequency offset of $\Delta f$ and time delay of $-\tau$ with respect to the RHCP signal's dominant component 906. Those values frequency offset, $\Delta f$, and the time delay, $\tau$, are also used to time- and -frequency align the dominant components 904 and 906 of the signals with each other for diversity combining.

For low-order modulations, the frequency offset, $\Delta f$, and the time delay, $\tau$, for RHCP and LHCP signals can be determined by tracking and correlating signals using a single IC (i.e., $IC_1$). But, for high-order modulation, the present invention achieves more efficient IC-based diversity combining and interference cancellation by acquiring and tracking the signals using triple ICs (i.e., Triple $IC_A$ and Triple $IC_B$) in conjunction with the single IC (i.e., $IC_1$) in an iterative process (i.e., each IC is enabled after the prior IC's gain has settled). As FIG. 10 illustrates, each of those triple ICs includes three single ICs (i.e., Triple $IC_A$ includes $IC_2$, $IC_3$, and $IC_4$, and Triple $IC_B$ includes $IC_5$, $IC_6$, and $IC_7$,) that also work together iteratively, in different paired combinations (i.e., $IC_2$ and $IC_3$ or $IC_2$ and $IC_4$ for Triple $IC_A$, and $IC_5$ and $IC_6$ or $IC_5$ and $IC_7$ for Triple $IC_B$), to remove the two XPD interference components 908 and 910 from the two channels' inputs (i.e., $I_1$ and $I_2$). Accordingly, one combination of ICs (e.g., $IC_2$ and $IC_3$) in a triple IC (e.g., Triple $IC_A$) will yield one output (e.g., Combined B) for a specific input, while the other combination of ICs (e.g., $IC_2$ and $IC_4$) in the triple IC (e.g., Triple $IC_A$) will yield a different output (e.g., Combined B') for that same specific input. In FIG. 10, $IC_2$, $IC_3$, and $IC_4$ are each configured substantially the same as illustrated for $IC_1$, but are illustrated as blocks merely to simplify the drawing; and Triple $IC_B$ is configured substantially the same as illustrated for Triple $IC_A$, but is also illustrated as a block merely to simplify the drawing.

With XPD-induced interference, the inputs of each IC have power contributions from the carrier signal, from noise, $N_x$, and from interference, $I_x$. For example, $IC_1$ has power contributes of ½P from the carrier signal, P$\gamma$ from noise, and ½$\beta^2$P from interference, wherein ½P is the power for the reduced-aperture remote terminal antenna 804 (i.e., assuming ½P is coming from each of the adjacent satellites 806 and 808), $\gamma$ is noise power relative to signal power (i.e., the noise-to-power ratio), and $\beta$ is interference scaling (i.e., the magnitude of cross-polarized signals). Thus, the resulting combined output for $IC_1$ (i.e., Combined A) therefore has power contributions of 2P for the carrier signal, $P[2\gamma(1+\mu L)+\beta^2 \mu L]$ for noise (i.e., $N_A$), and $\beta^2$P for interference (i.e., $I_A$). FIG. 11 illustrates the corresponding input and output components for each of the ICs, as described in more detail below.

In operation, $IC_1$ uses interference cancelling and diversity combining, as described above, to determine frequency offset, $\Delta f$, and the time delay, $\tau$. And, $IC_1$ uses an adaptive filter (e.g., a finite impulse response (FIR) filter) to time- and frequency-align one channel's input signal, $I_1$, with the other channel's input signals, $I_2$. $IC_1$ outputs a time- and frequency-aligned first signal (i.e., $I_1$ time- and frequency-aligned with respect to $I_2$) as a first output, $O_1$, that is then combined with the other channel's unaltered input signal, $I_2$, to generate combined signal A. And, $IC_1$ subtracts the first output, $O_1$, from the other channel's unaltered input signal, $I_2$, to obtain a cancelled output, which is the second output, $O_2$.

The adaptive filter uses the Least Mean Square (LMS) algorithm to find the weights, or coefficients, that correspond to producing the least amount of error when frequency shifting and fractional-sample delaying an input signal $I_1$ to align it with the other input signal $I_2$. The adaptive filter, however, introduces pass-band gain into the signal $I_1$. Accordingly, $IC_1$ corrects the altered gain of the first input signal, $I_1$, after time- and frequency-aligning the first input signal, $I_1$, with respect to the second input signal, $I_2$. In addition, the interference cancelling and diversity combining does not remove the XPD interference components 908 and 910. Thus, although $IC_1$ corrects the gain in first combined signal A, that signal still includes the two XPD interference components 908 and 910.

The second output, $O_2$, is also affected by the two XPD interference components 908 and 910. Thus, after $IC_1$ corrects the altered gain of combined signal A, Triple $IC_2$ removes the first interference component 908 and Triple $IC_3$ removes the second interference component 910, with each of those Triple ICs also correcting for the altered gain resulting from their associated corrections.

Assuming that each IC uses an adaptive filter with a span, L, and a very small step size, μ, relative to the span, L, (e.g., μ<<1/L), the expected LMS gain, α, is the sum of the adaptive filter's weights for minimizing the pass-band gain introduced by the adaptive filter and can be calculated from each IC's power. Preferably, the expected LMS gain, α, at each of the ICs is obtained with a step size of μ=0.01 for the first 32000 samples, which is then averaged and dumped every 1024 samples with a step size of μ=0.005.

$IC_1$ utilizes an adaptive filter to correct the altered gain of the input signal $I_1$ and $I_2$ after time- and frequency aligning them. $IC_1$'s power can be calculated for the reduced-aperture remote terminal antenna 304 from the following equation:

$$IC_1 \text{Power} = \tfrac{1}{2}(1-\alpha_1)^2 P + (B_N N_0 + \tfrac{1}{2}\beta_1^2 P)(1+\alpha_1^2),$$

wherein $B_N$ is noise bandwidth (and symbol rate) and $N_0$ is spectral density. The expected LMS gain, $\alpha_1$, for $IC_1$ is found by minimizing $IC_1$'s power with respect to $\alpha_1$ and letting $\gamma = [P/B_N N_0]^{-1}$, which yields $$\alpha_1 = [1+2\gamma+\beta^2]^{-1}.$$

$IC_1$'s adaptive filer output is then scaled by a factor of $K_1$ equal to $\alpha_1^{-1}$ (i.e., $K_1 = 1/\alpha_1$) to achieve unity gain across $IC_1$.

As discussed above, the scaled first output, $O_1$, of $IC_1$ includes the time- and frequency-aligned first input signal (i.e., $I_1$ time- and frequency-aligned with respect to $I_2$), which is combined with the unaltered second input signal, $I_2$, to obtain signal A, which becomes the second input, $I_2'$, for Triple $IC_A$ and Triple $IC_B$; and the scaled second output, $O_2$, of $IC_1$ includes the cancelled output obtained from subtracting the first output, $O_1$, from the unaltered second input signal, $I_2$, which also still includes both interference components 908 and 910, and becomes the first input, $I_1'$, for Triple $IC_A$ and Triple $IC_B$.

Triple $IC_A$'s first IC, $IC_2$, utilizes an adaptive filter to remove the first XPD interference component 908 from $IC_1$'s second output, $O_2$, based on that interference component's 908 interference scaling, $\approx \beta$, which can be determined from $IC_1$'s power. $IC_2$'s power can be calculated from the following equation:

$$IC_2 \text{Power} = \tfrac{1}{2}(2-\alpha_2\beta)^2 P + \beta^2(1-\tfrac{1}{2}\alpha_2^2)P + 2\gamma(1+\alpha_2^2).$$

Minimizing $IC_2$'s power with respect to $IC_2$'s expected LMS gain, $\alpha_2$, yields:

$$\alpha_2 = \beta/(2\gamma+\beta^2),$$

which can also be written as $\alpha_2 = \beta(\alpha_1^{-1}-1)^{-1}$ where $\alpha_1 = [1+2\gamma+\beta^2]^{-1}$. Then, solving for β and γ yields $\beta = \alpha_2(\alpha_1^{-1}-1)$ and $\gamma = \tfrac{1}{2}(\alpha_1^{-1}-1)[1-\alpha_2^2(\alpha_1^{-1}-1)]$. $IC_1$'s second output, $O_2$, is then scaled by a factor $K_2$ equal to $2/(\beta\alpha_2)$ (i.e., $K_2 = 2\alpha_2^{-2}(\alpha_1^{-1}-1)^{-1}$) to remove the first XPD interference component 908 from $IC_1$'s second output, $O_2$. $K_2$ is set to $2/(\beta\alpha_2)$ instead of $1/\alpha_2$ because the signal component in $I_2$ of $IC_2$ is $2/\beta$ times the interference component in $I_1$, which has to be cancelled.

$IC_2$'s output, $O_2'$, becomes the first input, $I_1''$, for $IC_3$ and $IC_4$; the first combined signal A is their second input, $I_2''$. But, before becoming $I_1''$ for $IC_4$, $IC_2$'s output, $O_2'$, is scaled by $\beta/2$ (i.e., $\tfrac{1}{2}\alpha_2(\alpha_1^{-1}-1)$) to scale and align $IC_2$'s output, $O_2'$, with the interference component 908 in $I_2''$ of $IC_4$. The second input, $I_2''$, is delayed as it passes through to $IC_A$ and $IC_B$ so that $IC_3$ and $IC_4$ of $IC_A$ and $IC_6$ and $IC_7$ of $IC_B$ each see a positive delay of the second input, $I_2''$, with respect to their first input, $I_1''$, just like the inputs to $IC_2$.

Triple $IC_A$'s second IC, $IC_3$, utilizes an adaptive filter to time- and frequency-align the output, $O_2'$, from $IC_2$ and perform partial diversity combining of that output with the first combined signal A of $IC_1$'s output, $O_1$, to obtain a second combined signal B. But, in addition to the expected LMS gain, $\alpha_3$, $IC_3$ also introduces a final gain, $\eta_1$, wherein $0 < \eta_1 < 1$. Using a scaling factor based on the gain, $\eta_1$, present before diversity combining helps achieve the highest possible Signal-to-interference-plus-noise (SINR) for the process. The expected LMS gain, $\alpha_3$, is determined based on $IC_3$'s power. $IC_3$'s power can be calculated from the following equation:

$$IC_3 \text{Power} = P\{2(1-\alpha_3)^2 + \tfrac{1}{2}\beta^2(1-\alpha_3)^2 + \tfrac{1}{2}\beta^2(1+\alpha_3^2) + 2\gamma[1+\alpha_3^2(1+4\beta^2)]\}.$$

Minimizing $IC_3$'s power with respect to $IC_3$'s expected LMS gain, $\alpha_3$, yields:

$$\alpha_3 = (4+\beta^2)[4\beta^2 + 4\gamma(1+4\beta^2) + \beta^2]^{-1}.$$

Then, $IC_3$'s adaptive filer output is scaled by a factor of $K_3$ equal to $\eta_1/\alpha_3$, to provide a first output, $O_1'$, which is further scaled by $2/\beta$ (i.e., $\tfrac{1}{2}\alpha_2(\alpha_1^{-1}-1)$) to achieve unity gain across $IC_2$ and $IC_3$ and to undo the gain in the interference component 908 in $I_1'$, which is then combined with the first combined signal A to obtain a second combined signal B. The second combined signal B then passes to an adder before passing to the demodulator at the remote ground terminal 802 for decoding.

Triple $IC_A$'s third IC, $IC_4$, utilizes an adaptive filter to time- and frequency-align the output, $O_2'$, from $IC_2$ and perform partial interference cancelling of that output with the second combined signal B to obtain a third combined signal B'. But, like the partial diversity combining of $IC_3$, the partial interference cancelling of $IC_4$ introduces a final gain, $\eta_2$, in addition to the expected LMS gain, $\alpha_4$, of $IC_4$, wherein $0 < \eta_2 < 1$. Using a scaling factor based on the gain, $\eta_2$, present before interference cancelling further helps achieve the highest possible SINR for the process. The expected LMS gain, $\alpha_4$, is determined based on $IC_4$'s power. $IC4_4$'s power can be calculated from the following equation:

$$IC_4 \text{Power} = P\{\tfrac{1}{2}(\beta-\alpha_4\beta)^2 + 2 + \tfrac{1}{2}\beta^2 + \tfrac{1}{4}\alpha_4^2\beta^4 + 2\gamma[1+\alpha_4^2(1+\tfrac{1}{4}\beta^2)]\}.$$

Minimizing $IC_4$'s power with respect to its expected LMS gain, $\alpha_4$, yields:

$$\alpha_4 = \beta^2[\beta^2 + \tfrac{1}{2}\beta^4 + 4\gamma(1+\tfrac{1}{4}\beta^2)]^{-1}.$$

Then, $IC_4$'s adaptive filer output is scaled by a factor of $K_4$ equal to $\eta_2/\alpha_4$ to achieve unity gain across $IC_2$ and $IC_4$ to provide a first output, $O_1''$, of $IC_4$. The first output, $O_1''$, of $IC_4$ is then subtracted from second combined signal B to obtain third combined signal B', which then passes to an adder before passing to the demodulator at the remote ground terminal 802 for decoding.

The process for Triple $IC_B$ is substantially the same as that described for Triple $IC_A$. Triple $IC_B$'s first IC, $IC_5$, removes the second XPD interference component 910 from $IC_1$'s second output, $O_2$, based on that interference component's 910 interference scaling, β, which can be determined from $IC_5$'s power. Triple $IC_B$'s second IC, $IC_6$, time- and frequency-aligns the output from $IC_5$ and performs partial diversity combining of that output, $O_1'$, with the third combined signal B' to obtain a fourth combined signal C. Triple $IC_B$'s third IC, $IC_7$, time- and frequency-aligns the output from $IC_5$ and performs partial interference cancelling of that output, $O_1''$, with the fourth combined signal C to obtain a fifth combined signal C'. Triple $IC_B$ operates in parallel with Triple $IC_A$, with their outputs being combined to obtain B, B', C, and, finally, C'. Both XPD interference components 908 and 910 are substantially removed and the signals $I_1$ and $I_2$ are time and frequency aligned in combined signal C', which puts signal C' in a superior condition for data extraction when passed to the demodulator at the remote ground terminal 802.

SINR for the process of FIG. 10 is calculated as:

$$SINR=2(1+\eta_1\beta)^2/[2\gamma+4\gamma(\eta_1^2+\eta_2^2)(1+\tfrac{1}{4}\beta^2)+(\beta+\tfrac{1}{2}\eta_1\beta^2-\eta_2\beta)^2+\tfrac{1}{4}\beta^4(\eta_1^2+2\eta_2^2)].$$

SINR is at its highest in terms of interference scaling, $\beta$, and, noise-to-signal ratio, $\gamma$, when partial DC gain, $\eta_1$, and partial IC gain, $\eta_2$, equal the following:

$$\eta_1 = \frac{32\gamma^2 + 16\gamma\beta^3 + 8\gamma^2\beta^3 + 2\gamma^5 + 4\gamma\beta^5 + 2\beta^5 + 5\beta^7 - 6\beta^6}{64\gamma^2 + 32\gamma^2\beta^2 + 4\gamma^2\beta^4 + 2\gamma\beta^6 + 12\gamma\beta^4 + 16\gamma\beta^2 - 2\beta^7 + 3\beta^6}$$

$$\eta_2 = \frac{4\gamma\beta^5 + 4\gamma\beta^4 + 16\gamma\beta^3 + \beta^6}{64\gamma^2 + 32\gamma^2\beta^2 + 4\gamma^2\beta^4 + 2\gamma\beta^6 + 12\gamma\beta^4 + 16\gamma\beta^2 - 2\beta^7 + 3\beta^6},$$

wherein $\beta=\alpha_2(\alpha_1^{-1}-1)$ and $\gamma=\tfrac{1}{2}(\alpha_1^{-1}-1)[1-\alpha_2^2(\alpha_1^{-1}-1)]$, as calculated above for $IC_2$. Thus, by way of example, if $\beta=0.5$ (e.g, XPD amplitude=−6 dB) and $\gamma=0.125$ (e.g., noise-to-power ratio=−9 dB), then $\eta_1=0.31$ and $\eta_2=0.18$. FIG. 12 illustrates the SINR at the input of each IC for $\beta=0.5$ and $\gamma=0.125$.

In Triple $IC_A$ and Triple $IC_B$, the third ICs, $IC_4$ and $IC_7$, respectively, have the most stringent phase-locked loop whose narrowed bandwidth achieves signal synchronization when $SINR=\beta^2/[\gamma(8+\beta^2)+4+\beta^2+\tfrac{1}{2}\beta^4]$, which is approximately −13 dB at many practical $\beta$ and $\gamma$ values. And, a phase-locked loop of the form $$\hat{\theta}(n) = \theta(n) - \sum_{k=1}^{M} h(k) \cdot \hat{\theta}(n-k)$$

will have a variance of $\sigma_{101}^2$ with no system phase noise, and the loop bandwidth, $B_L$, will be $$H(e^{jw}) = \sum_{k=1}^{M} h(k) e^{-jwk}$$

for phase detection rate $f_s$ and frequency $\omega=2\pi f/f_s$. Thus, for $IC_4$ and $IC_7$, the phase variance, $\sigma_{101}^2$, can be calculated as:

$$\sigma_{101}^2=(8\gamma+\gamma\beta^2+4+\beta^2+\tfrac{1}{2}\beta^4)(M\beta^2+8\gamma+\gamma\beta^2+4+\beta^2+\tfrac{1}{2}\beta^4)/(M^2\beta^4),$$

wherein M is an averaging parameter. The loop bandwidth, $B_L$, which is approximately equal to the symbol rate, $B_N$, divided by the averaging parameter, M (i.e., $B_L \approx B_N/M$), can thus be chosen to obtain a small phase variance, $\sigma_\Phi^2$, which allows $IC_4$ and $IC_7$ to achieve signal synchronization.

The iterative operation of the ICs of the present invention provide substantial benefit for high-order modulations (i.e., $\geq 3$ bps/Hz with high $E_s/N_0$) or when XPD is poor. Preferably, when XPD is good (i.e., XPD=−21 dB), only $IC_1$ will be enabled. And, when XPD is poor (i.e., when there is a high $\beta^2$ to $\gamma$ ratio), such as during intense rain, Triple $IC_A$ and Triple $IC_B$ will be enabled. Weather-induced changes in XPD that would trigger that additional processing are deduced by monitoring the expected LMS pass-band gain, $\alpha_1$, at $IC_1$.

Figure 13:
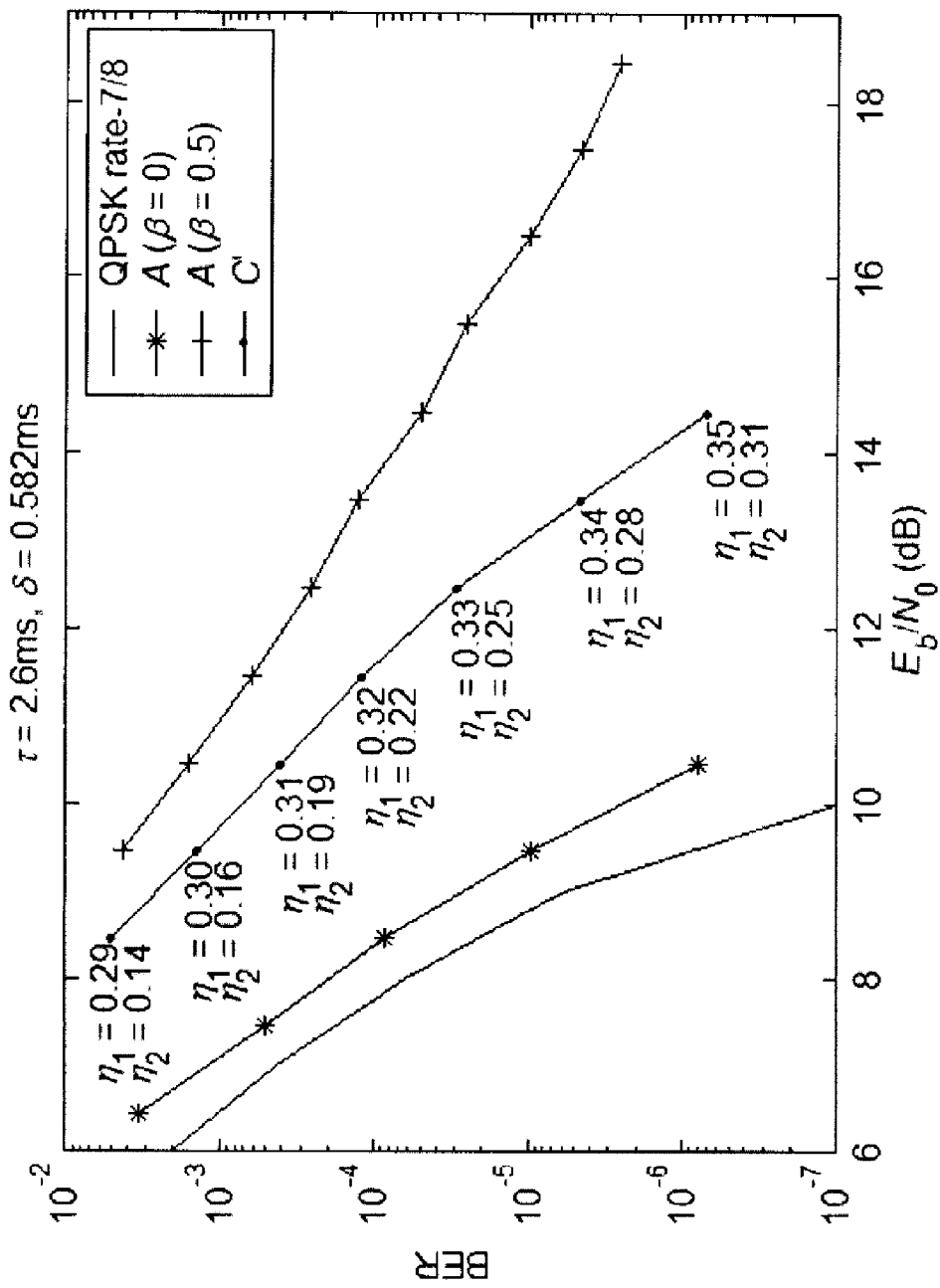
FIG. 13 is a graph of the performance of the dual-satellite system illustrated in FIG. 8.

Thus, as FIG. 13 illustrates, in a dual-satellite system 800 employing the iterative interference cancellation of the present invention, system performance (measured in terms of BER and $E_b/N_0$ gain) is improved by more than 3 dB when compared to a single-satellite system employing Quadrature Phase-Shift Keying (QPSK) encoded at a rate of ⅞ convolutional (inner), which also enables a larger overall gain (i.e., including outer code) for high-signal-to-noise-ratio (high-SNR). That improvement was observed for an XPD of −6 dB and a 0.46 dB pointing loss, which is an extreme example. Accordingly, the dual-polarized dual-satellite system 800 of the present invention provides a link budget with a reduced depolarization margin, as compared to a single-satellite system 100.

The complexity of using PD in a single-satellite system can be the substantially same as in a dual satellite system (i.e., there can be a delay spread based on the frequency of operation of the two polarizations due to weather and/or ionospheric scintillation). Accordingly, although the process for reducing XPD of the present invention is described in terms of a dual-satellite system 800, that process may also be employed to reduce XPD in a single-satellite system. The single-satellite system, however, does not provide the benefit of a reduced-aperture remote terminal antenna 804 as in the dual-satellite system 800.

Exemplary Benefits

Among the benefits provided by the various embodiments of the present invention are a lower susceptibility to pointing errors, smaller antenna aperture, and reduced ASI. Reduced pointing errors reduce demands on SATCOM-on-the-move sensor resolution and servo motor power (e.g., in adverse winds) as well as terminal alignment time. Reduced antenna aperture size reduces terminal weight and overall terminal size (e.g., for maritime and Man-Pack VSATs), which also reduces the cost of the terminal. The cost of the remote ground terminal 302 in the dual-satellite system 300 that utilizes STC is further reduced because the remote terminal antenna 804 can be an off-the-shelf single-polarization antenna when STC is used.

In addition, smaller ASI provides for increased terminal transmit power, which allows higher order modulations to be used in transmitting and receiving signals. And, although terminal transmit power is described as being equal for each satellite in the embodiments above, one of ordinary skill in the art will appreciate that the present invention can be used with whatever terminal transmit power is available and/or allowed.

The cost of leasing two transponders with the same downlink power is offset by economy of larger scale production of smaller remote terminals or where the small size of the remote terminal has higher intrinsic value (e.g., value in transportability and weight). And, the cost of a remote terminal antenna 804 in a phased-array dual-satellite system 300 or 800 may be reduced by as much as a factor of four.

Although each of the above systems and methods of the present invention is described in terms of dual satellites, any number of satellites greater than two can be used. For example, the system and method using point-to-multipoint return links with PD can be employed in a system with four or more satellites, provided the downlink polarizations for each satellite alternate from satellite to satellite. Increasing the number of satellites, however, increases the costs associated with leasing the transponders on those satellites, which may more difficult to offset.

The foregoing description and drawings should be considered as illustrative only of the principles of the invention. The invention may be configured in a variety of shapes and sizes and is not intended to be limited by the preferred embodiment.

Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A system for communicating with a remote ground terminal via a first satellite and a second satellite adjacent the fist satellite, the system comprising:
a first hub antenna configured to receive a first return signal from and to transmit a first forward signal to the first satellite;
a second hub antenna configured to receive a second return signal from and to transmit a second forward signal to the second satellite; and
a hub station configured to determine time delay and frequency shift between the first return signal and the second return signal after, and to apply the determined time delay and frequency shift to at least one of the first forward signal and the second forward signal so the first forward signal and the second forward signal are time- and frequency-aligned when received at the remote ground terminal via the first satellite and the second satellite,
wherein the first return signal and the second return signal are transmitted from the remote ground terminal to the first hub antenna and the second hub antenna via the first satellite and the second satellite.

2. The system of claim 1, wherein STC encoding is applied to the first forward signal and the second forward signal after the determined differential delay and frequency shift is applied to at least one of the first forward signal and the second forward signal.

3. The system of claim 1, wherein the remote ground terminal includes a reduced-aperture antennae that is pointed at a mid-point between the first satellite and the second satellite.

4. The system of claim 1, wherein the hub station includes a receiver with a diversity combiner and interference canceller for determining the time delay and frequency shift.

5. The system of claim 1, wherein the time delay and frequency shift are determined by using Binary Phase-Shift Keying (BPSK) to determine phase shift with blind estimation, tracking time delay and phase changes with a 2nd-order control loop, and resolving phase ambiguity with forward-error correction.

6. The system of claim 5, wherein the forward-error correction is performed by a Viterbi decoder.

7. The system of claim 1, wherein the first satellite and the second satellite have identical-band transponders.

8. The method of claim 7, wherein the identical-band transponders each have the same downlink power as a transponder in a single-satellite system.

9. A method for communicating with a remote ground terminal via a first satellite and a second satellite adjacent to the first satellite, the method comprising the steps of:
transmitting a return signal from the remote ground terminal to the first satellite and the second satellite;
re-transmitting the return signal from the first satellite as a first return signal;
re-transmitting the return signal from the second satellite as a second return signal;
receiving the fist return signal with a first hub antenna;
receiving the second return signal with a second hub antenna;
determining time delay and frequency shift between the first return signal and the second return signal after they are received with the first hub antenna and the second hub antenna; and
applying the determined time delay and frequency shift to at least one of a first forward signal and a second forward signal prior to transmitting the first forward signal with the first hub antenna and transmitting the second forward signal with the second hub antenna so the first forward signal and the second forward signal are time- and frequency-aligned when received at the remote ground terminal via the first satellite and the second satellite.

10. The method of claim 9, further comprising the step of applying STC encoding to the first forward signal and the second forward signal after the determined differential delay and frequency shift is applied to at least one of the first forward signal and the second forward signal.

11. The method of claim 9, further comprising the step of pointing a reduced-aperture antennae of the remote ground terminal at a mid-point between the first satellite and the second satellite.

12. The method of claim 9, wherein the step of determining differential delay and frequency shift includes estimating differential delay and frequency shift with a diversity combiner and interference canceller at a receiver at the first hub antenna and the second hub antenna.

13. The method of claim 9, wherein the step of determining differential delay and frequency shift includes using Binary Phase-Shift Keying (BPSK) to determine phase shift with blind estimation, tracking time delay and phase changes with a 2nd-order control loop, and resolving phase ambiguity with forward-error correction.

14. The method of claim 13, wherein the step of a resolving phase ambiguity with forward-error correction is performed by a Viterbi decoder.

15. The method of claim 9, wherein the first satellite and the second satellite have identical-band transponders.

16. The method of claim 15, wherein the identical-band transponders have the same downlink power as a transponder in a single-satellite system.

17. A system for communicating with a remote ground terminal via adjacent satellites comprising:
a remote ground terminal configured to send two or more first polarized signals to the adjacent satellites and to receive the two or more first polarized signals from the adjacent satellites when the adjacent satellites re-transmit the two or more first polarized signals,
wherein the remote ground terminal receives the re-transmitted two or more first polarized signals, determines differential delay and frequency shift between the re-transmitted two or more first polarized signals, and applies the determined differential delay and frequency shift to two or more subsequently received second polarized signals so the two or more subsequently received second polarized signals are time- and -frequency aligned for processing at the remote ground terminal.

18. The system of claim 17, wherein the two or more polarized signals are right- and left-handed circularly polarized signals.

19. The system of claim 17, wherein the remote ground terminal determines differential delay and frequency shift with a diversity combiner and interference canceller.

20. The system of claim 17, wherein cross-polarization discrimination (XPD) is minimized before diversity combining the two or more polarized signals.

21. The method of claim 17, wherein the two or more adjacent satellites include transponders configured to have different polarizations from one another.

22. The method of claim 21, wherein a first adjacent satellite includes a Global C-band A transponder and a second adjacent satellite includes a Global C-band B transponder.

23. The method of claim 17, wherein the remote ground terminal includes a reduced-aperture antenna with dual polarization transmitters and receivers.

24. A method for enabling reduced antenna aperture in a remote ground terminal, comprising the steps of:
sending two or more polarized signals from the remote ground terminal to two or more adjacent satellites;
receiving the two or more polarized first signals at the remote ground terminal when they are repeated for transmission by the two or more adjacent satellites;
determining differential delay and frequency shift between the repeated two or more polarized signals received at the remote ground terminal;
applying the determined differential delay and frequency shift to subsequently received signals from the two or more adjacent satellites to time- and frequency-align the subsequently received signals for processing at the remote ground terminal.

25. The method of claim 24, wherein the step of sending two or more polarized signals includes sending right- and left-handed circularly polarized signals.

26. The method of claim 24, wherein the step of determining differential delay and frequency shift includes estimating differential delay and frequency shift with a diversity combiner and interference canceller at the remote ground terminal.

27. The method of claim 24, further comprising the step of minimizing cross-polarization discrimination (XPD) before diversity combining the two or more polarized signals.

28. The method of claim 24, wherein the two or more adjacent satellites include transponders configured to have different polarizations from one another.

29. The method of claim 28, wherein a first adjacent satellite includes a Global C-band A transponder and a second adjacent satellite includes a Global C-band B transponder.

30. The method of claim 24, wherein the remote ground terminal includes a reduced-aperture antenna with dual polarization transmitters and receivers.

31. A for communicating with a remote ground terminal via adjacent satellites comprising the steps of:
sending a first polarized signal and a second polarized signal to the remote ground terminal from a first hub antenna and a second hub antenna via a first satellite and a second satellite adjacent to the first satellite, the first and second polarized signals each having a dominant component and an interference component;
auto-correlating the first and second polarized signals at the remote ground terminal to identify the dominant component in each of the first and second polarized signals;
determining the values for frequency shift and time delay between the dominant components of the first and second polarized signals;
time- and frequency-aligning the dominant component of the first polarized signal with the interference component of the second polarized signal and the dominant component of the second polarized signal with the interference component of the first polarized signal using the determined values for frequency shift and time delay;
cancelling the interference component of the second polarized signal from the time- and frequency-aligned dominant component of the first polarized signal;
cancelling the interference component of the first polarized signal from the time- and frequency-aligned dominant component of the second polarized signal; and
combining the dominant component of the first polarized signal with the dominant component of the second polarized signals after cancelling the interference components,
wherein the interference components of the first and second polarized signals are cancelled and the dominant components of the first and second polarized signals are combined using a plurality of interference cancellers that operate iteratively with one another.

32. The method of claim 31, further comprising a step of offsetting a repetition encoder's output streams at the hub station by a fixed time that is slightly longer than a maximum time delay between the first and second polarized signals to ensure that the dominant component of the first polarized signal is received at the remote ground terminal later than the dominant component of the second polarized signal.

33. The method of claim 31, wherein the step of auto-correlating utilizes a time-frequency ambiguity function.

34. The method of claim 31, wherein the step of determining the values for frequency shift and time delay utilizes diversity combining and interference cancellation at the remote ground terminal.

* * * * *